United States Patent
Koyama et al.

(10) Patent No.: US 9,213,290 B2
(45) Date of Patent: Dec. 15, 2015

(54) IMAGE FORMING APPARATUS CAPABLE OF CHANGING THE NUMBER OF LIGHT RECEIVING ELEMENTS OF A LIGHT RECEIVING UNIT

(71) Applicant: CANON KABUSHIKI KAISHA, Tokyo (JP)

(72) Inventors: Satoru Koyama, Mishima (JP); Atsuhiko Yamaguchi, Suntou-gun (JP); Shuhei Watanabe, Susono (JP); Takuya Mukaibara, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 14/342,589

(22) PCT Filed: Sep. 26, 2012

(86) PCT No.: PCT/JP2012/075579
§ 371 (c)(1),
(2) Date: Mar. 4, 2014

(87) PCT Pub. No.: WO2013/061737
PCT Pub. Date: May 2, 2013

(65) Prior Publication Data
US 2014/0226997 A1    Aug. 14, 2014

(30) Foreign Application Priority Data

Oct. 24, 2011   (JP) .................................. 2011-233263
Aug. 24, 2012   (JP) .................................. 2012-185767

(51) Int. Cl.
*G03G 15/00*     (2006.01)
*B41J 2/44*      (2006.01)
(Continued)

(52) U.S. Cl.
CPC .............. *G03G 15/5025* (2013.01); *B41J 2/44* (2013.01); *B41J 29/46* (2013.01); *G03G 15/00* (2013.01);
(Continued)

(58) Field of Classification Search
CPC .......... G03G 15/5025; G03G 15/5041; G03G 15/5058; G03G 15/00; G03G 15/01; G03G 2215/0164; G03G 2215/0161; G03G 2215/00042; G03G 2215/00059; B41J 2/44; B41J 9/46; H04N 1/6044; H04N 1/23; H04N 1/50
See application file for complete search history.

(56) References Cited

U.S. PATENT DOCUMENTS 4,796,065 A    1/1989  Kanbayashi
6,166,814 A   12/2000  Pringle
(Continued)

FOREIGN PATENT DOCUMENTS

JP    07-306556 A      11/1995
JP    2003-098798 A     4/2003
(Continued)

OTHER PUBLICATIONS

International Search Report in PCT/JP2012/075579 dated Nov. 13, 2012.

*Primary Examiner* — David Gray
*Assistant Examiner* — Laura Roth
(74) *Attorney, Agent, or Firm* — Fitzpatrick, Cella, Harper & Scinto

(57) ABSTRACT

An image forming apparatus includes an image carrier, an image forming unit configured to form a patch image on the image carrier, and a light emitting unit. In addition, a light receiving unit receives light reflected by the patch image when the patch image that moves with movement of the image carrier is irradiated with light by the light emitting unit, and includes one or more light receiving elements. A setting unit sets a first subset of light receiving elements for receiving reflected light from a first patch image and sets a second subset of light receiving elements for receiving reflected light from a second patch image, with the number of light receiving elements in the first subset differing from that in the second subset.

8 Claims, 21 Drawing Sheets

(51) Int. Cl.
    *B41J 29/46*    (2006.01)
    *G03G 15/01*    (2006.01)
    *H04N 1/23*     (2006.01)
    *H04N 1/50*     (2006.01)
    *H04N 1/60*     (2006.01)

(52) U.S. Cl.
    CPC ............ *G03G 15/01* (2013.01); *G03G 15/5058* (2013.01); *H04N 1/23* (2013.01); *H04N 1/50* (2013.01); *H04N 1/6044* (2013.01); *G03G 2215/00042* (2013.01); *G03G 2215/00059* (2013.01); *G03G 2215/0161* (2013.01); *G03G 2215/0164* (2013.01)

(56) References Cited

U.S. PATENT DOCUMENTS

| | | | |
|---|---|---|---|
| 6,853,817 | B2 | 2/2005 | Suzuki |
| 7,272,333 | B2 | 9/2007 | Mizes |
| 7,498,578 | B2 | 3/2009 | Scheuer et al. |
| 7,715,770 | B2 | 5/2010 | Kinoshita |
| 2003/0049039 | A1 | 3/2003 | Suzuki |
| 2009/0238590 | A1 | 9/2009 | Masuda |
| 2011/0019044 | A1 | 1/2011 | Wang et al. |
| 2011/0044713 | A1 | 2/2011 | Masuda et al. |
| 2013/0156472 | A1 | 6/2013 | Watanabe |
| 2013/0302048 | A1 | 11/2013 | Sekiguchi et al. |
| 2013/0302049 | A1 | 11/2013 | Nakagawa et al. |
| 2013/0302050 | A1 | 11/2013 | Shimba et al. |
| 2013/0302051 | A1 | 11/2013 | Shimba et al. |
| 2014/0168677 | A1 | 6/2014 | Mukaibara et al. |
| 2014/0308049 | A1* | 10/2014 | Yamaguchi ........ G03G 15/0189 399/49 |

FOREIGN PATENT DOCUMENTS

| | | |
|---|---|---|
| JP | 2003-162117 A | 6/2003 |
| JP | 2008-199419 A | 8/2008 |
| JP | 2008-249714 A | 10/2008 |
| JP | 2010-152132 A | 7/2010 |
| JP | 2010-211118 A | 9/2010 |
| JP | 2011-209686 A | 10/2011 |

* cited by examiner

F I G. 5A
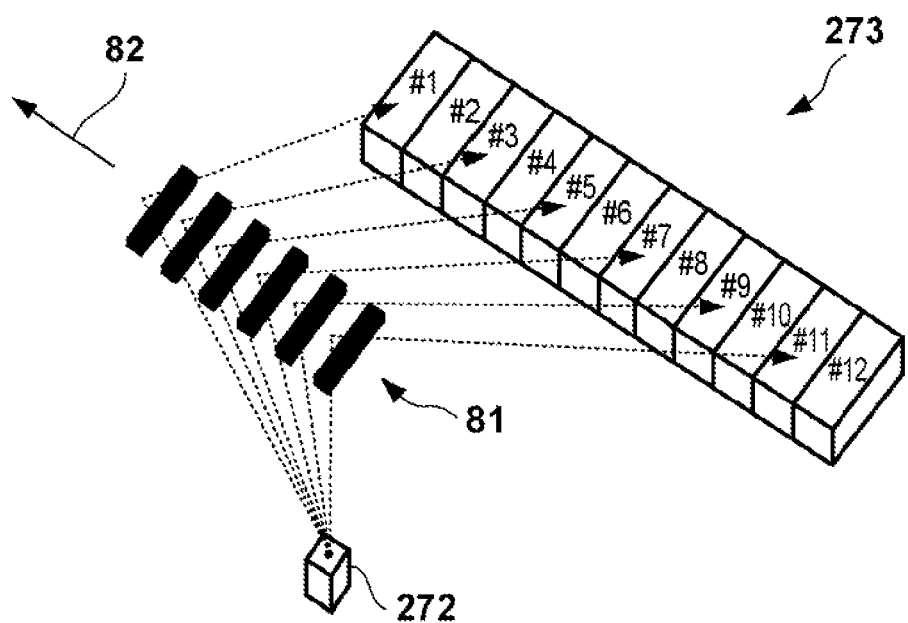
F I G. 5B
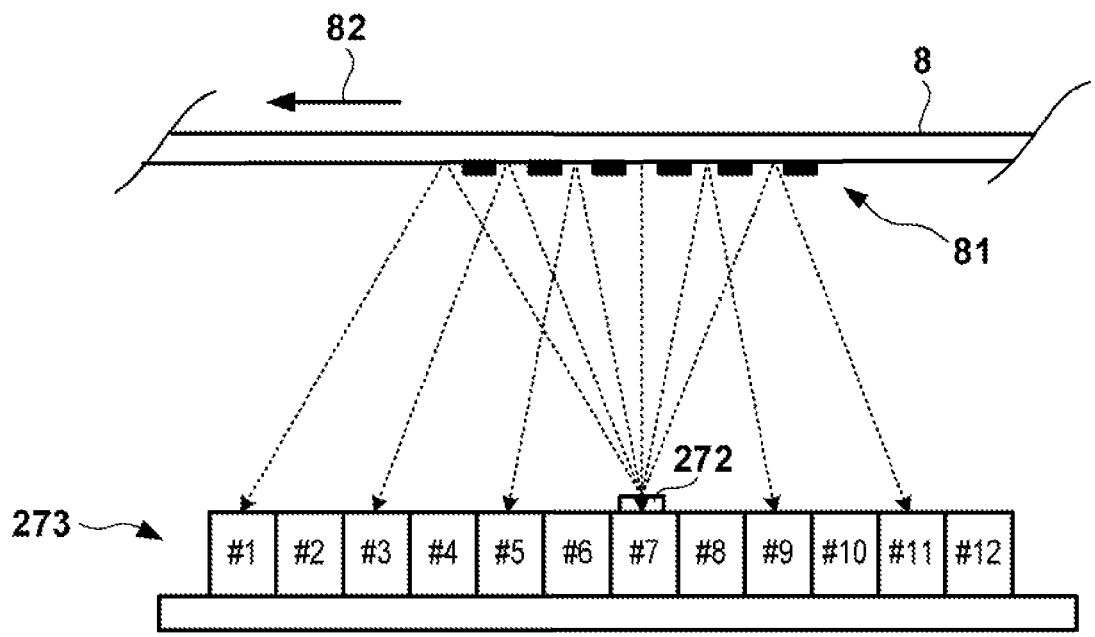

F I G. 10
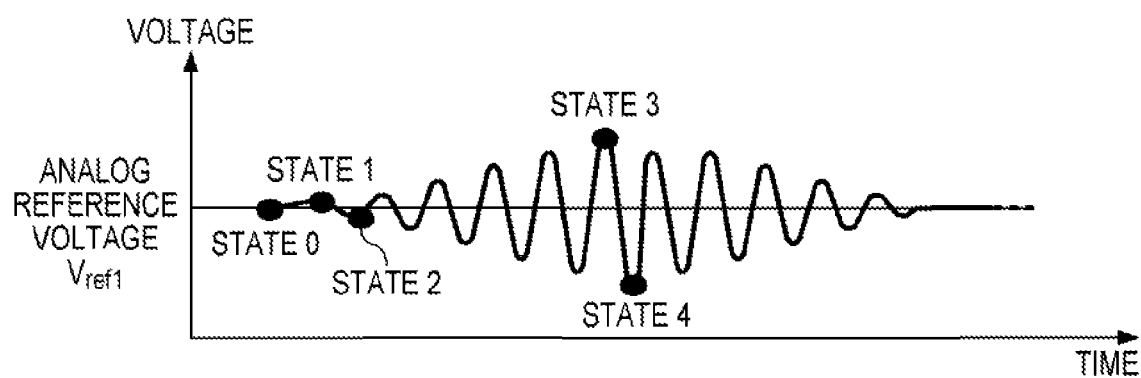

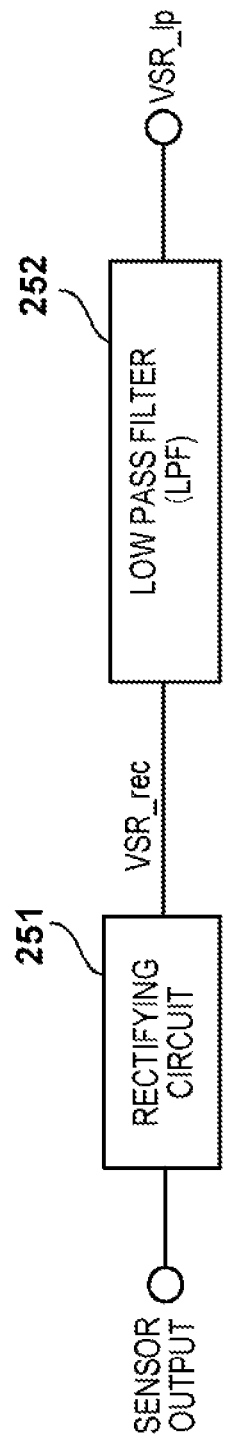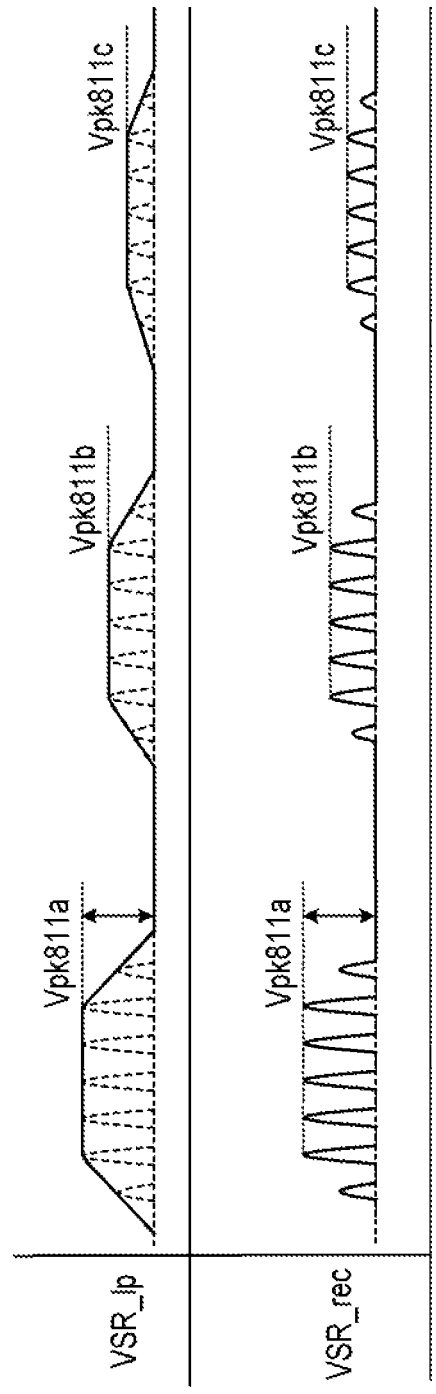

IMAGE FORMING APPARATUS CAPABLE OF CHANGING THE NUMBER OF LIGHT RECEIVING ELEMENTS OF A LIGHT RECEIVING UNIT

TECHNICAL FIELD

The present invention relates to image forming apparatuses such as copiers, printers and faxes.

BACKGROUND ART

There are, for example, image forming apparatuses that are provided with photosensitive members in correspondence with the colors yellow (Y), magenta (M), cyan (C) and black (Bk), and form a color image by transferring toner images of the respective colors to an intermediate transfer belt or the like so as to be overlaid on each other. In such an image forming apparatus, so-called color shift in which the relative positions of the different color toner images shift can occur. Color shift occurs due to factors such as write position shift in the main scanning direction, magnification shift in the main scanning direction, tilting or bending of scan lines in the main scanning direction, and write position shift in the sub-scanning direction.

Japanese Patent Laid-Open No. 2003-162117 discloses a configuration for forming a plurality of patch images for color shift detection on the intermediate transfer belt or the like, and calculating and correcting the amount of color shift, or in other words, the amount of position shift from a target position for forming the patch images, from the detected position of each patch image.

Furthermore, the density characteristics of images that are printed by an image forming apparatus vary due to the influence of factors such as change in the characteristics of components over time, variation in characteristics at the time of manufacture, and the use environment. Japanese Patent Laid-Open No. 2008-249714 discloses a configuration for adjusting density by forming a patch image for detecting density.

In Japanese Patent Laid-Open No. 2008-249714, first, light is irradiated by a light emitting element consisting of an infrared light emitting diode or the like onto a color toner image formed on an intermediate transfer body, and light that is specularly reflected at that time is received by a light receiving element for specularly reflected light, while light that is diffusely reflected is received by a light receiving element for diffusely reflected light. Here, the light receiving elements can be constituted by phototransistors, for example. The density of the color toner image is derived from the output of both light receiving elements.

At this time, the infrared light emitting diode and phototransistors are held by being enclosed in a package. Passageways are formed in the package for securing a light path for light irradiated by the light emitting element to travel to the object being irradiated, and a light path for light specularly reflected by the object being irradiated to travel to the light receiving elements. A passageway for securing a light path for light diffusely reflected by the object being irradiated to travel to the light receiving elements may also be formed in the package. A focusing mechanism member may also be provided for focusing on a detection location.

With conventionally known light amount detection sensors for patch images, it is, for instance, necessary to form large light passageways in the package, as described above, in order to separate specularly reflected light and diffusely reflected light, with this being a problem in that it leads to an increase in size of the light amount detection sensor. Even in the case where a focusing mechanism member is provided for focusing on a detection location, a similar problem of increased size arises. That is, there is demand for miniaturization of light amount detection sensors.

On the other hand, as mentioned above, it is envisioned that the sensor provided in the image forming apparatus will be used in correction control in different situations such as color shift control. That is, in addition to the above demand, there is demand for a highly convenient light amount detection sensor that is compatible with various patch images.

SUMMARY OF INVENTION

The present invention provides an image forming apparatus equipped with a light amount detection sensor that is compatible with multiple applications, while at the same time solving the problem of the increase in size of the light amount detection sensor.

According to an aspect of the present invention, an image forming apparatus includes an image carrier; an image forming unit configured to form a patch image on the image carrier; a light emitting unit; a light receiving unit configured to receive light reflected by the patch image when the patch image that moves with movement of the image carrier is irradiated with light by the light emitting unit, and including one or more light receiving elements; and a setting unit configured to set the number of the light receiving elements included in the light receiving unit. The setting unit is further configured to set the number of light receiving elements for when receiving reflected light from a first patch image formed by the image forming unit and the number of light receiving elements for when receiving reflected light from a second patch image formed by the image forming unit that differs from the first patch image to different numbers.

Further features of the present invention will become apparent from the following description of exemplary embodiments with reference to the attached drawings.

BRIEF DESCRIPTION OF DRAWINGS

FIGS. 5A and 5B are diagrams illustrating reception of specularly reflected light from a patch image in an embodiment;

FIG. 10 is a diagram showing an output waveform of a sensor in an embodiment;

FIG. 17A is a block diagram of a control unit in an embodiment;

FIG. 17B is a diagram showing a waveform of each component in FIG. 17A;

DESCRIPTION OF EMBODIMENTS

First Embodiment

Figure 1:
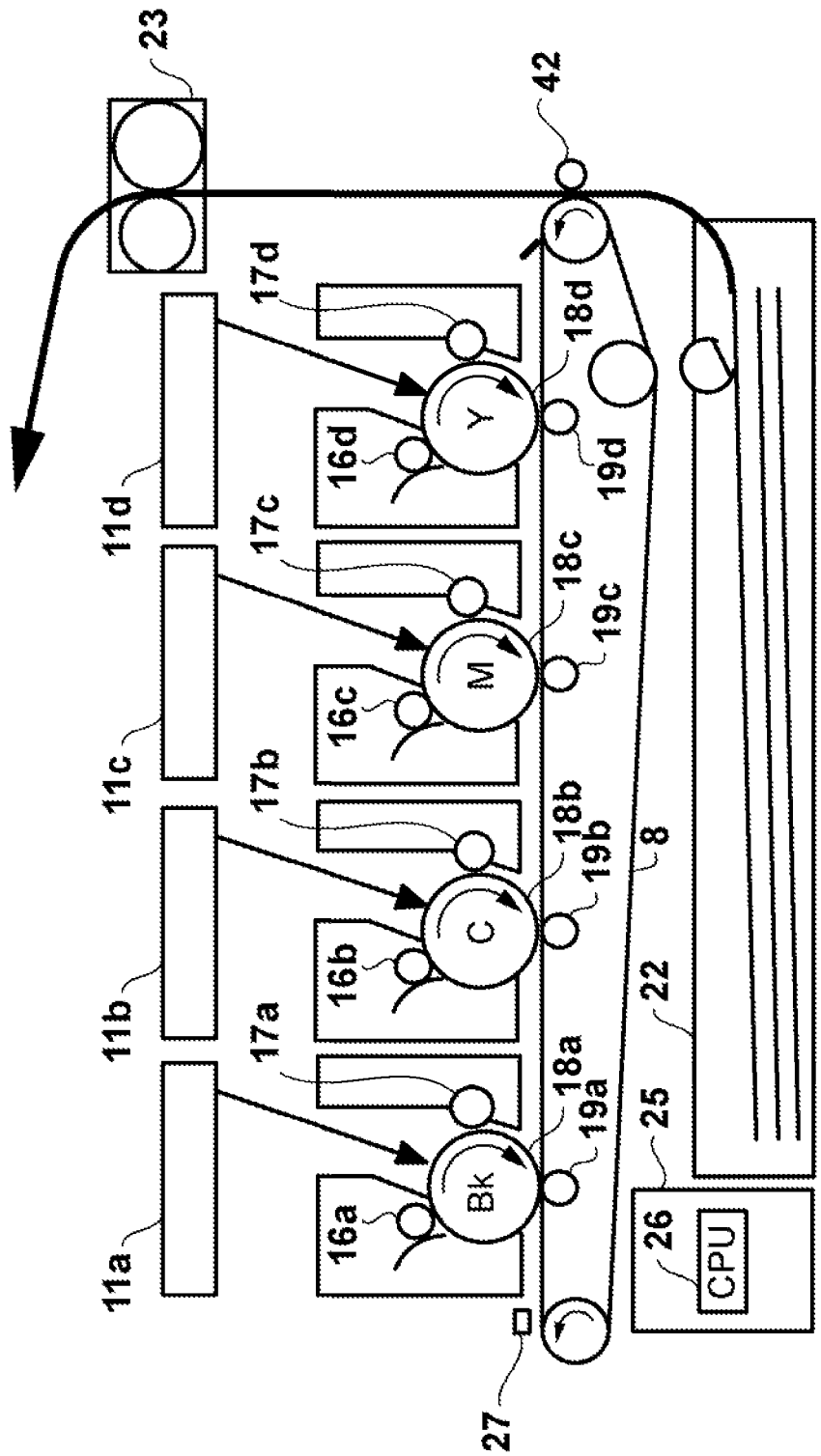
FIG. 1 is a diagram showing a configuration of an image forming apparatus in an embodiment.

First, an image forming unit 100 of an image forming apparatus according to the present embodiment will be described using FIG. 1. In FIG. 1, a charging unit 16a uniformly charges a photosensitive member 18a serving as an image carrier, and an exposure unit 11a irradiates the photosensitive member 18a with a laser beam and forms an electrostatic latent image. A developing unit 17a develops the electrostatic latent image on the photosensitive member 18a with black toner to form a toner image. A primary transfer unit 19a transfers the toner image on the photosensitive member 18a to an intermediate transfer belt 8 serving as an image carrier. Note that exposure units 11b to 11d, charging units 16b to 16d, developing units 17b to 17d, photosensitive members 18b to 18d, and primary transfer units 19b to 19d are respectively for forming cyan, magenta and yellow toner images on the intermediate transfer belt 8. A color image is formed as a result of the different colored toner images being transferred to the intermediate transfer belt 8 so as to be overlaid on each other.

A secondary transfer unit 42 performs secondary transfer of the toner images on the intermediate transfer belt 8 to a recording material that is taken out from a cassette 22. A fixing unit 23 applies heat and pressure to the toner images transferred to the recording material to fix the toner images to the recording material. Also, a control unit 25 is provided with a CPU 26, and the CPU 26 performs overall control of the image forming apparatus, such as control relating to image formation and control relating to fault detection.

Here, the image forming apparatus is provided with a sensor 27 that measures the color shift and density of patch images for color shift detection and density detection formed on the intermediate transfer belt 8 by the image forming unit 100. Note that the data of the patch images for color shift detection and density detection that are generated by the image forming unit 100 is saved in advance in a storage unit which is not shown. Toner images (patch images) are formed by the image forming unit 100 in accordance with this patch image data.

Also, the control unit 25 receives an output signal of the sensor 27, and automatically performs color shift correction and maximum density correction or halftone density correction. Note that maximum density correction is performed by changing process conditions (image forming conditions) such as developing bias and charging bias. Also, intermediate density correction is correction, so-called gamma correction (image forming condition correction), for ensuring that image signals and image density are in a linear relationship. The control unit 25 executes these corrections in the case where a prescribed condition is met, such as when a predetermined number of sheets have been printed, when power is turned on, or when the image forming apparatus receives input from a user instructing that correction be performed.

Note that although description was given taking a tandem image forming apparatus that uses the intermediate transfer belt 8 as the image forming apparatus, the present invention is not limited thereto. For example, the image forming apparatus may be a device that transfers toner images formed on a plurality of photosensitive members directly to a recording material. Furthermore, the image forming apparatus may be a rotary type constituted by a single photosensitive member. Furthermore, the image forming apparatus may be a device that performs correction control based on a patch image formed on a photosensitive member.

Figure 2:
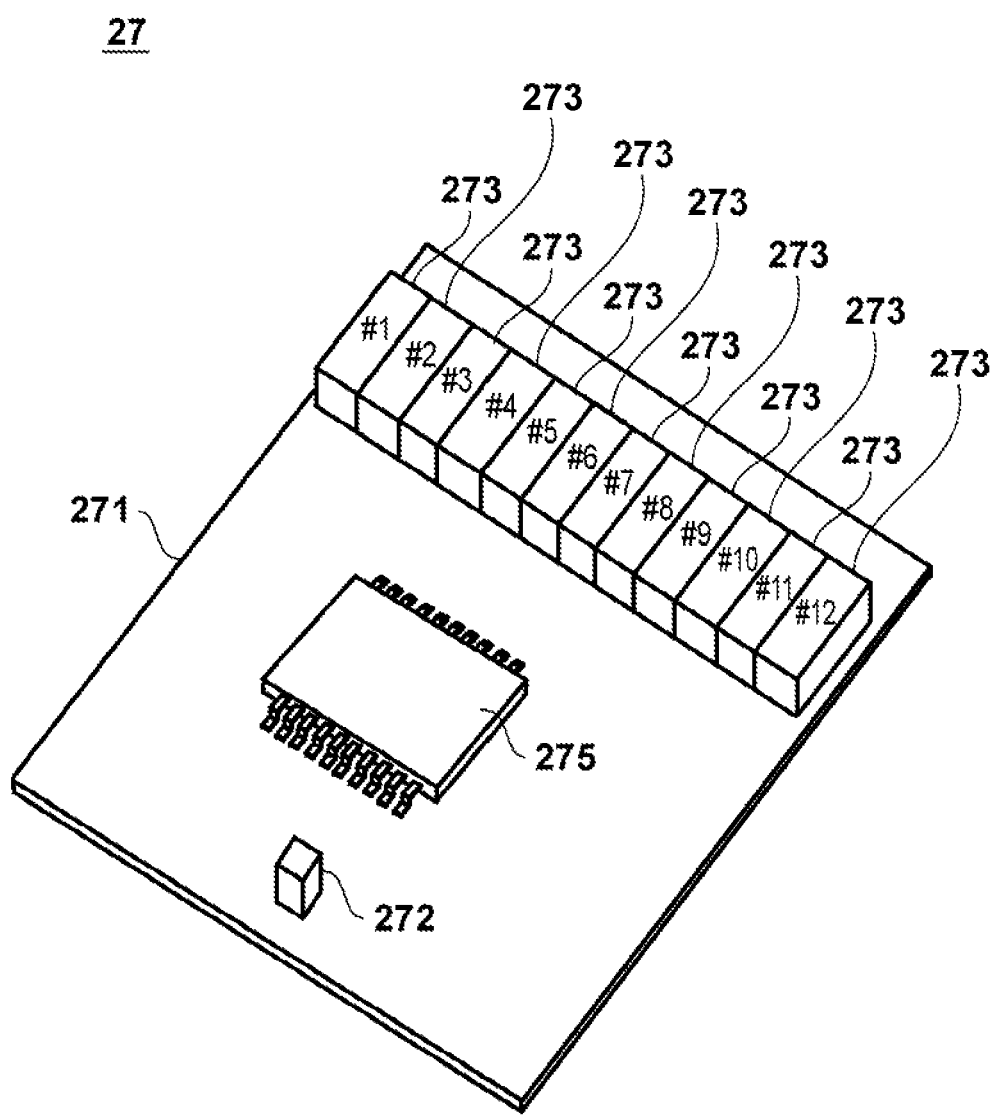
FIG. 2 is a perspective view showing a configuration of a sensor in an embodiment.

The sensor 27 of the present embodiment is configured by disposing a light emitting element 272, a plurality of light receiving elements 273, and a control IC 275 having a control circuit formed therein on the same surface of a substrate 271, as shown in FIG. 2. Note that the control IC 275 is electrically connected to the CPU 26 directly or via a signal forming circuit which will be described later. The light emitting element 272 is an LED, for example, and the light receiving elements 273 are photodiodes, for example, and are disposed adjacently so as to be able to receive light reflected by the image patches when light is irradiated by the light emitting element 272. Here, in the present embodiment, the light receiving elements 273 are disposed at an equal pitch. Note that in the following description, twelve light receiving elements 273 are used. Also, #1 to #12 displayed on the light receiving elements 273 in the diagrams are the numbers of the light receiving elements 273. Also, the light receiving surface of each light receiving element 273 is the surface on the opposite side to the surface that contacts the substrate 271, and the width thereof is assumed to be equal to the width of the light receiving element 273 in the array direction.

Figure 3:
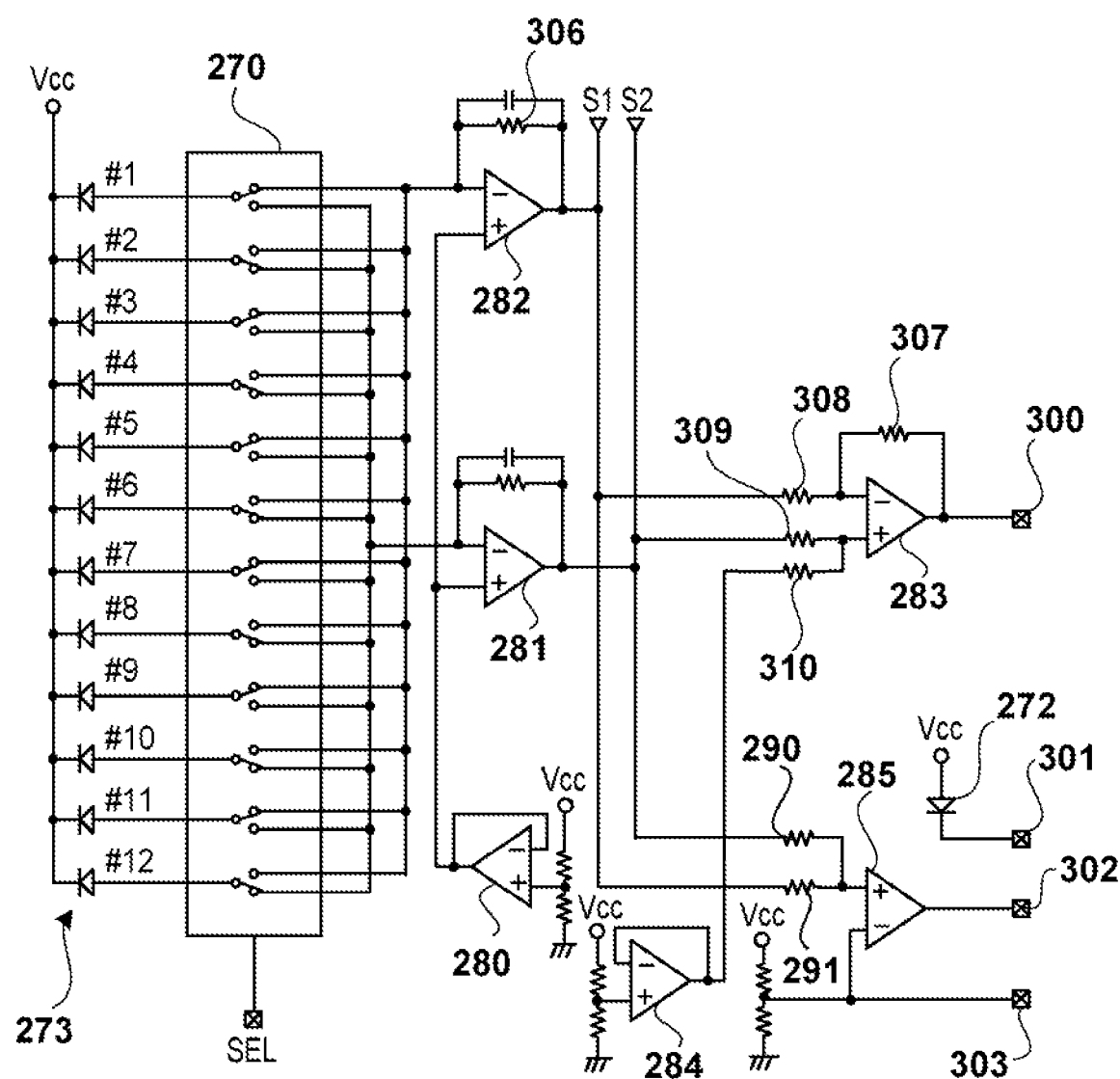
FIG. 3 is a circuit diagram of a sensor in an embodiment.

FIG. 3 is a diagram showing the circuitry of the control IC 275 and the electrical connection between the light emitting element 272 and the light receiving elements 273. The output of each light receiving element 273 is connected to an inverting input terminal of an IV conversion amplifier 281 or 282 by a selection circuit 270 constituted by an analog switch or the like. Note that the selection circuit 270 is controlled by control data input to a terminal SEL by the control unit 25, and is able to select (set) an output destination independently for each of the #1 to #12 light receiving elements 273. Note that the number of the light receiving elements 273 that output to the IV conversion amplifier 281 is the same as the number of the light receiving elements 273 that output to the IV conversion amplifier 282, with exemplary selections being shown in FIGS. 4A and 4B.

Figure 4A:
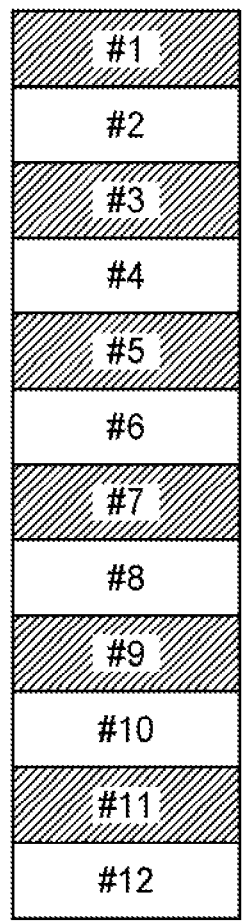
FIGS. 4A and 4B are diagrams showing changes in pitch of light receiving elements in an embodiment.
Figure 4B:
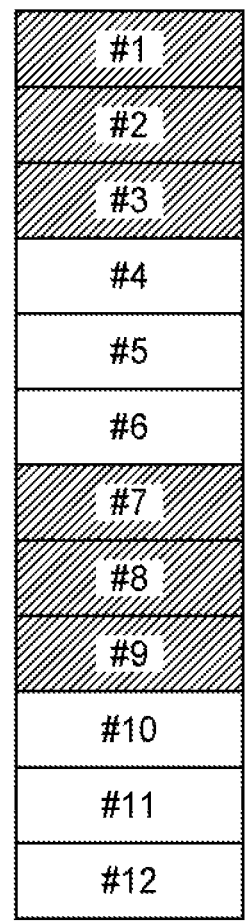
Figure 19:
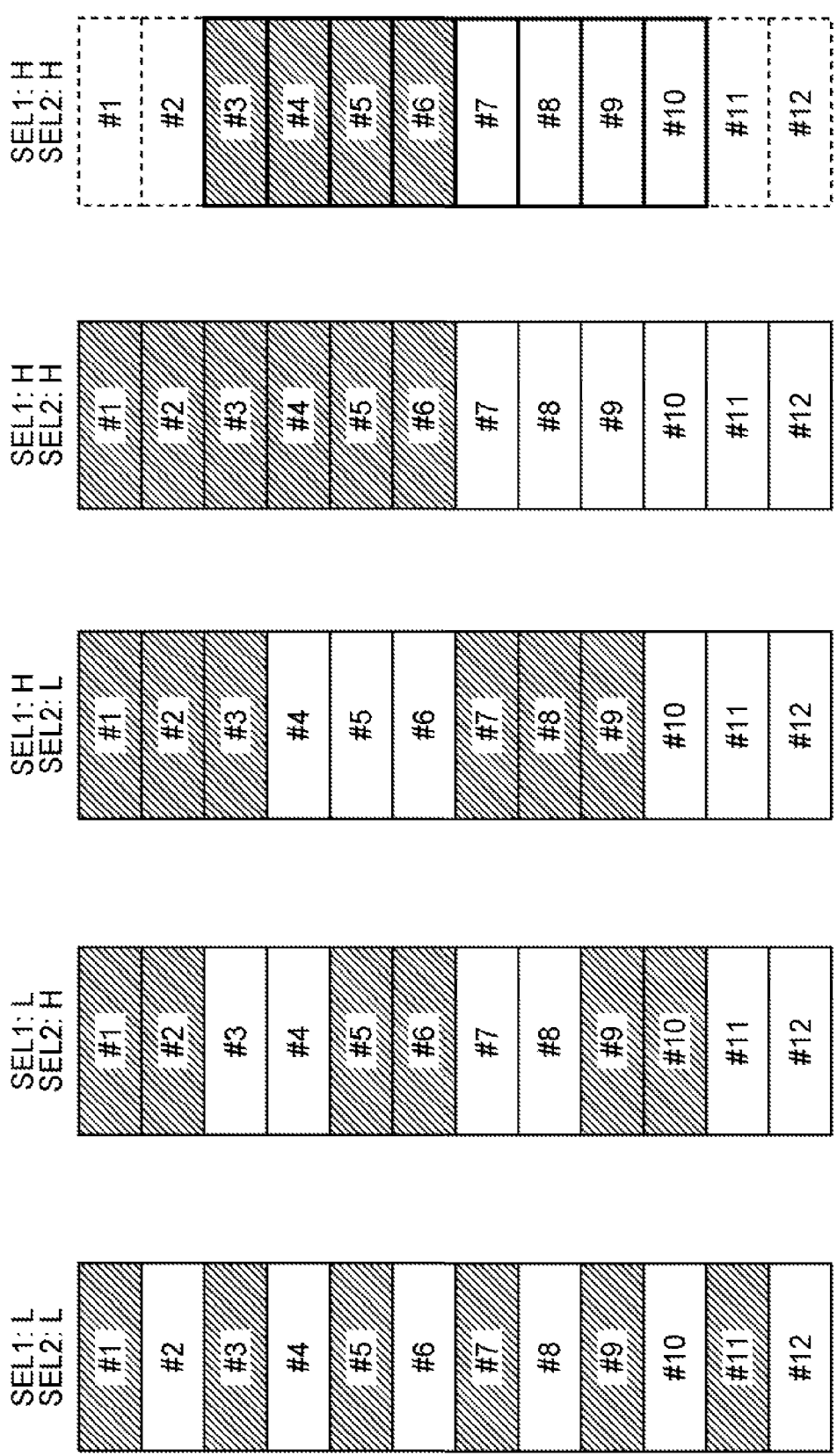
FIGS. 19A to 19E are diagrams showing changes in pitch of light receiving elements in an embodiment.

In FIGS. 4A and 4B, the shaded light receiving elements 273 are connected to the IV conversion amplifier 282, and the remaining light receiving elements 273 are connected to the IV conversion amplifier 281. In FIG. 4A, the odd-numbered light receiving elements 273 are connected to the IV conversion amplifier 282, and the even-numbered light receiving elements 273 are connected to the IV conversion amplifier 281. Also, in FIG. 4B, the light receiving elements 273 numbered #1 to #3 and #7 to #9 are connected to the IV conversion amplifier 282, and the light receiving elements 273 numbered #4 to #6 and #10 to #12 are connected to the IV conversion amplifier 281. As will be discussed later, FIG. 4A shows a configuration used in the case of detecting color shift in the present embodiment, and FIG. 4B shows a configuration used in the case of detecting density. In the following description, the light receiving elements 273 connected to the IV conversion amplifier 282 will be called first light receiving elements, and the light receiving elements 273 connected to the IV conversion amplifier 281 will be called second light receiving elements. In other words, in the state of FIG. 4A, the odd-numbered light receiving elements are the first light receiving elements, and the even-numbered light receiving elements are the second light receiving elements. Note that the designations "first" and "second" of the first light receiving elements and the second light receiving elements are for distinguishing between these light receiving elements, and the first light receiving elements may be called second light receiving elements, and the second light receiving elements may be called first light receiving elements. Also, connection configurations of the light receiving elements to the IV conversion amplifiers, such as shown in FIG. 19B and FIG. 19D which will be discussed later, may be realized by control data input to the terminal SEL.

A reference voltage is input from a voltage follower element 280 to the non-inverting input terminal of the IV conversion amplifier 282 serving as an operational amplifier. The first light receiving elements each output a current corresponding to the amount of received light to an inverting input terminal of the IV conversion amplifier 282. Since the impedance of the inverting input terminal and the non-inverting input terminal of an ideal operational amplifier is infinite, the current corresponding to the total amount of light received by the first light receiving elements will flow to a resistor 306 connected between the inverting input terminal and the output terminal of the IV conversion amplifier 282. Also, the inverting input terminal and the non-inverting input terminal of an ideal operational amplifier (IV conversion amplifier) 282 are virtually short-circuited and potentials thereof are approximately equal. Therefore, in the case where none of the first light receiving elements are receiving light, an output voltage S1 (hereinafter, voltage S1) of the IV conversion amplifier 282 will be equal to the reference voltage, since current does not flow to the resistor 306 and there is no voltage drop caused by the resistor 306.

In contrast, the current flowing to the resistor 306 also increases as the total amount of light received by the first light receiving elements increases, and therefore the amount of voltage drop in the resistor 306 also increases. Accordingly, with the configuration in FIG. 3, the voltage S1 of the IV conversion amplifier 282 will decrease as the total amount of light received by the first light receiving elements increases. Note that a capacitor connected between the inverting input terminal and the output terminal of the IV conversion amplifier 282 is for phase compensation and denoising. Similarly, an output voltage S2 (hereinafter, voltage S2) of the IV conversion amplifier 281 will decrease as the total amount of light received by the second light receiving elements increases.

The voltage S1 is input to an inverting input terminal of a differential amplifier 283 serving as an operational amplifier constituting a subtraction circuit together with resistors 307 to 310, and the voltage S2 is input to a non-inverting input terminal of the differential amplifier 283. An analog reference voltage output by a voltage follower element 284 is input to the non-inverting input terminal of the differential amplifier 283. $S_{out}$ is represented by the following equation (A) when $R_{308}=R_{309}$ and $R_{307}=R_{310}$, where $V_{ref1}$ is the output voltage of the voltage follower element 284, $R_{308}$, $R_{307}$, $R_{309}$ and $R_{310}$ are respectively the resistance values of the resistors 308, 307, 309 and 310, and $S_{out}$ is the output of the differential amplifier 283.

$$S_{out}=(S2-S1)\times(R_{307}/R_{308})+V_{ref1} \quad (A)$$

Accordingly, the output of the differential amplifier 283 will be equal to the analog reference voltage $V_{ref1}$, when the voltage S1 and the voltage S2 are equal. Also, the output of the differential amplifier 283 will be lower than the analog reference voltage $V_{ref1}$ in the case where the voltage S1 is higher than the voltage S2, and will be higher than analog reference voltage $V_{ref1}$ in the case where the voltage S1 is lower than the voltage S2. The output of the differential amplifier 283 is output outside the control IC 275 from a terminal 300. The control IC 275 thus constitutes an output unit that outputs a signal ($=S_{out}$) that depends on the difference between the total amount of light received by the first light receiving elements and the total amount of light received by the second light receiving elements.

Note that a voltage obtained by adding the voltage S1 and the voltage S2 and voltage-dividing the result with the resistor 290 and the resistor 291 are input to the non-inverting input terminal of a differential amplifier 285. Here, the resistance values of the resistor 290 and the resistor 291 are equal. An output ((S1+S2)/2) equivalent to the total amount of light received by the light receiving elements 273 can then be detected, by short-circuiting a terminal 302 connected to the output of the differential amplifier 285 and a terminal 303 connected to the inverting input terminal of the differential amplifier 285. This is used for measuring and adjusting the amount of light irradiated by the light emitting element 272. Note that a terminal 301 is used in adjusting the amount of light irradiated by the light emitting element 272. For example, in response to a drop in the amount of light irradiated by the light emitting element 272 due to prolonged use, the amount of light emission can be adjusted by short-circuiting the terminals 302 and 303 in FIG. 3, detecting the total amount of light received by the light receiving elements 273, and using this to adjust the current flowing to the terminal 301 from the light emitting element 272. Also, adjustment of the amount of light irradiated by the light emitting element 272 is, for example, executed at the stage (timing) prior to detecting reflected light from a patch image 81 in the density control processing.

Next, reception by the sensor 27 of specularly reflected light from the intermediate transfer belt 8 and a banded patch image 81 will be described using FIGS. 5A and 5B. Note that, in FIG. 5A, the control IC 275 and the substrate 271 are omitted for simplification, and the first light receiving elements and the second light receiving elements are set as shown in FIG. 4A. Also, in FIGS. 5A and 5B, the arrow denoted by reference numeral 82 indicates the movement direction of the intermediate transfer belt 8. As shown in FIG. 5A, the patch image 81 is an image including a plurality of lines formed by toner at an equal pitch in the movement direction of the intermediate transfer belt 8, perpendicular to the movement direction, or in other words, orthogonal to the movement direction.

Figure 6:
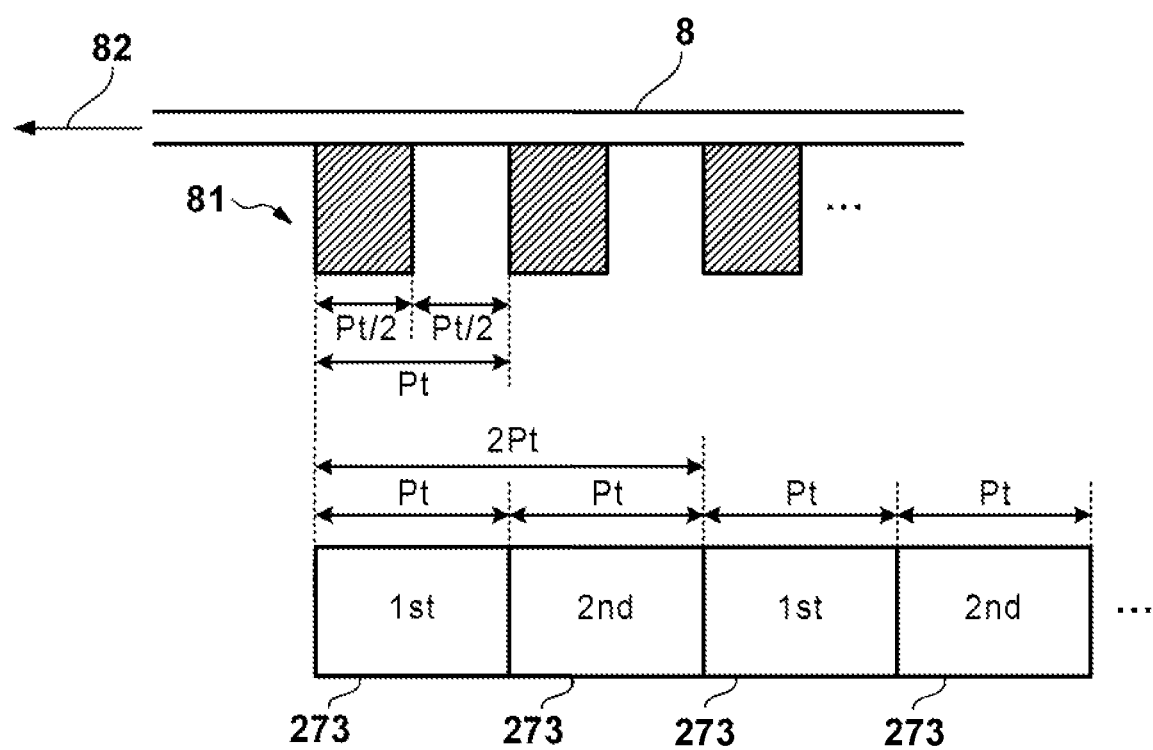
FIG. 6 is a diagram showing the relationship between the pitch of light receiving elements of a sensor and the pitch of lines of a patch image in an embodiment.

As shown in FIG. 5A, light irradiated between the toner lines of the patch image 81 by the light emitting element 272 is specularly reflected. In the present embodiment, as shown in FIG. 6, the pitch between adjacent toner lines (toner portions) of the patch image 81 is Pt, and the respective pitches between the first light receiving elements and between the second light receiving elements in the movement direction 82 is 2Pt, which is twice the pitch of the toner portions. Note that in all of the embodiments, the pitch of the toner portions, as shown in FIG. 6, denotes the distance between one toner portion and a corresponding position of the toner portion adjacent thereto, and does not denote the width of portions without toner (toner-less portions). In the present embodiment, as shown in FIG. 6, the widths of the toner portions and the toner-less portions are equally Pt/2.

Similarly, in all of the embodiments, as shown in FIG. 6, the pitch of the first light receiving elements denotes the distance between one light receiving element 273 and the light receiving element 273 adjacent thereto among the first light receiving elements, and does not denote the width of the space between light receiving elements. Also, the same applies to the second light receiving elements.

Furthermore, when light receiving elements 273 that are consecutively selected are regarded as one light receiving unit, in the case where groups of consecutively disposed light receiving elements (e.g., #1 to #3) are alternatively set as first light receiving elements and second light receiving elements, for example, as shown in FIG. 4B, the pitch is defined as the distance between light receiving units. Accordingly, in FIG. 4B, the distance between the #1 light receiving element and a corresponding position of the #7 light receiving element is the pitch of first light receiving units. In other words, with the configuration in FIG. 4B, the pitches related to the light receiving elements are respectively three fold as compared with the configuration in FIG. 4A. Note that in the case where the first light receiving elements and second light receiving elements are alternately set every light receiving element, one light receiving element will constitute one light receiving unit, in contrast to the case where light receiving elements 273 that are consecutively set are regarded as one light receiving unit.

Since the angle of incidence and the angle of reflection of a reflective surface of specularly reflected light are equal, light that is specularly reflected at two points that are separated by a distance D in the movement direction of the intermediate transfer belt 8 will be separated by twice that distance, or 2D, in the movement direction at the place where the light receiving elements 273 are disposed. Therefore, as a result of this configuration, light reflected between the toner portions of the patch image 81 will be incident on only the even-numbered light receiving elements 273 or the odd-numbered light receiving elements 273, or in other words, on only either the second light receiving elements or the first light receiving elements, depending on the position of the patch image 81. Note that FIG. 5A shows the incidence of specularly reflected light from the intermediate transfer belt 8 on only the odd-numbered light receiving elements 273. FIG. 5B, like FIG. 5A, is a diagram showing the incidence of specularly reflected light from the intermediate transfer belt 8 on only the odd-numbered light receiving elements 273, from a direction perpendicular to the movement direction of the intermediate transfer belt 8 and to a plane including the normal direction of the substrate 271.

Figure 7A:
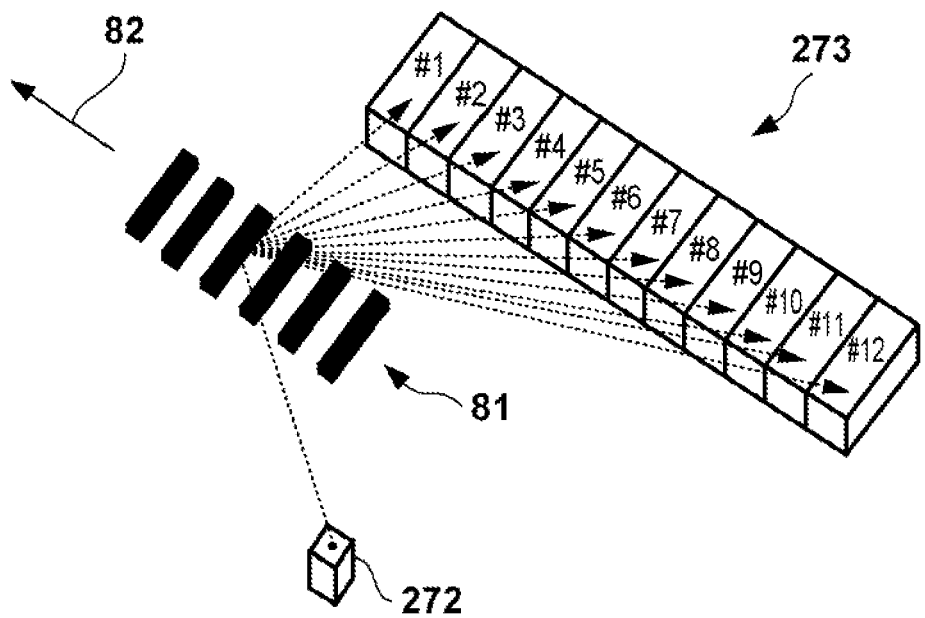
FIGS. 7A and 7B are diagrams illustrating reception of diffusely reflected light from a patch image in an embodiment.
Figure 7B:
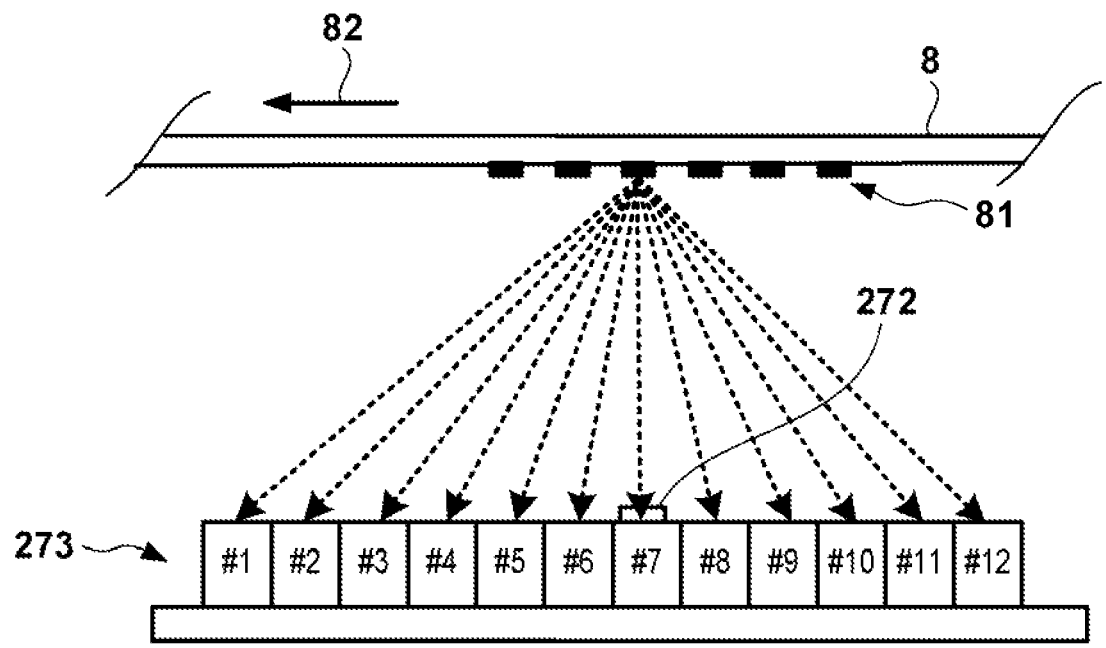

On the other hand, light irradiated onto the toner portions of the patch image 81 by the light emitting element 272 is diffusely reflected as shown in FIG. 7A. Accordingly, as shown in FIG. 7A, light reflected by the toner portions is uniformly incident on all of the light receiving elements 273. Note that the control IC 275 and the substrate 271 have also been omitted for simplification in FIG. 7A. Also, although FIG. 7A shows only diffusely reflected light from one line portion of the patch image 81, in actual fact, diffusely reflected light from each line portion is incident on the light receiving elements 273. FIG. 7B is a diagram in which, like FIG. 7A, incidence of diffusely reflected light on all of the light receiving elements 273 is shown, as viewed from the direction perpendicular to the movement direction of the intermediate transfer belt 8 and to the plane including the normal direction of the substrate 271.

Figure 8:
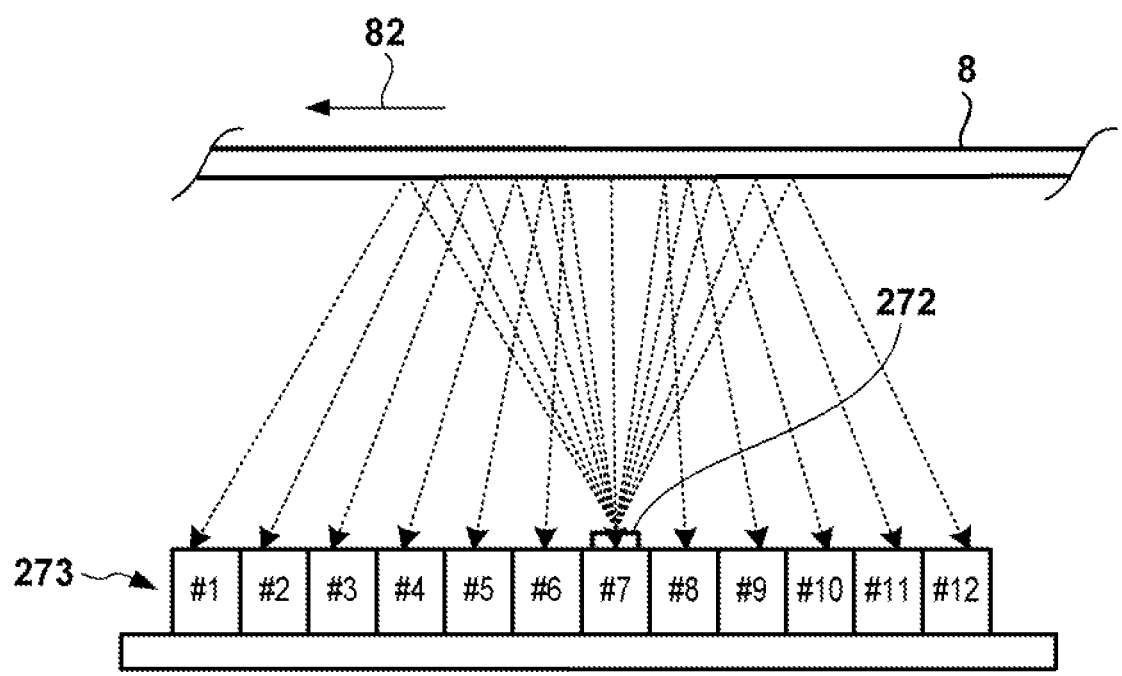
FIG. 8 is a diagram illustrating reception of reflected light from an area in which a patch image is not formed in an embodiment.

Also, in areas in which the patch image 81 is not formed, specularly reflected light reflected by the surface of the intermediate transfer belt 8 will be incident on all of the light receiving elements 273. This is shown in FIG. 8.

Description of Output of Sensor 27

Next, the output of the sensor 27 will be described. Note that in the following description, the selection circuit 270 is set to the connection configuration of FIG. 4A, and the patch image 81 is formed at the pitch and width shown in FIG. 6. When the patch image 81 is outside the detection range of the sensor 27 in this state, the specularly reflected light reflected by the surface of the intermediate transfer belt 8 is incident on both the first and second light receiving elements of the sensor 27. In this case, the voltages S1 and S2 of FIG. 3 are equal, and, therefore, the output of the sensor 27 will be the analog reference voltage $V_{refl}$.

In contrast, since light reflected by the toner-less portions is, depending on the position of the patch image 81, incident on only the first or second light receiving elements when the patch image 81 enters the detection range of the sensor 27, the voltages S1 and S2 will be different. Since the reflection position of reflected light from the toner-less portions changes due to the movement of the patch image 81, specularly reflected light is alternately received by the first light receiving elements and the second light receiving elements. In other words, the magnitude relationship between the voltage S1 and the voltage S2 will change alternately when the patch image 81 is within the detection range of the sensor 27. Therefore, when the patch image 81 is within the detection range of the sensor 27, the output of the sensor 27 will oscillate around the analog reference voltage $V_{refl}$.

Figure 9:
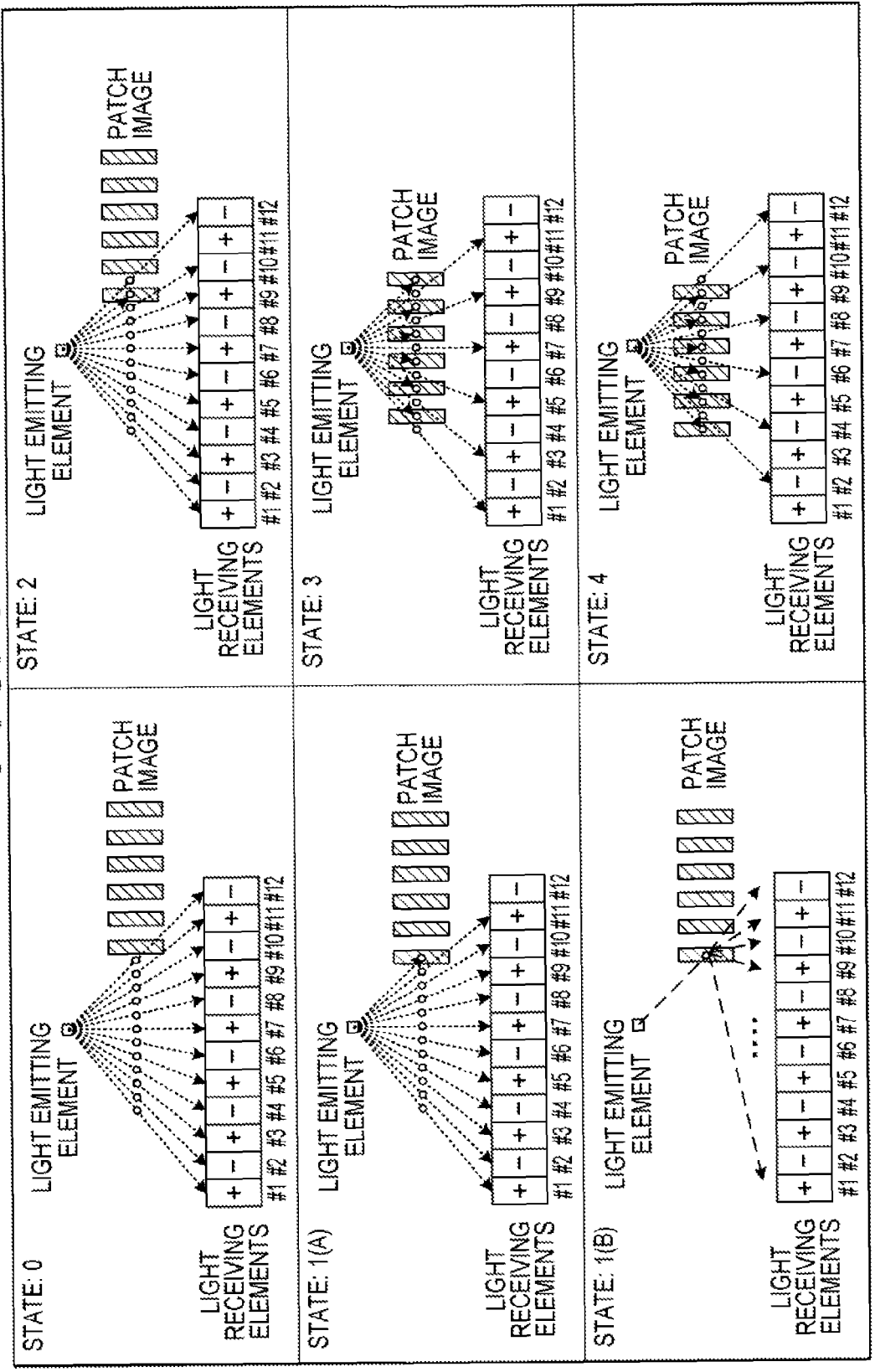
FIG. 9 is an illustrative diagram of output waveforms of a sensor in an embodiment.

This will be described more specifically using FIG. 9 and FIG. 10. Note that the light receiving elements 273 indicated with a "+" sign in FIG. 9 are the first light receiving elements, and the light receiving elements 273 indicated with a "−" sign are the second light receiving elements. Also, the number of each light receiving element 273 is shown below the light receiving elements. Furthermore, the patch image 81 is assumed to move toward the left side in the diagram. State 0 is a state in which each light receiving element 273 receives only specularly reflected light from an area of the intermediate transfer belt 8 on which the patch image 81 is not formed. Here, the circle mark on the dotted line of the arrows is the reflection point on the intermediate transfer belt 8. At this time, the total amounts of light received by the first and second light receiving elements are equal, and, therefore, the output of the sensor 27 will be the analog reference voltage as indicated by "State 0" in FIG. 10.

State 1 is a state in which the toner portion at the head of the patch image 81 reaches the reflection point of specularly reflected light to the #12 light receiving element 273. As shown in state 1(A), all of the light receiving elements apart from the #12 light receiving element 273 receive specularly reflected light. Also, as shown in state 1(B), each light receiving element 273 receives diffusely reflected light from the toner portion at the head of the patch image 81. Therefore, the #12 light receiving element 273 will receive only diffusely reflected light, and not specularly reflected light. On the other hand, the other light receiving elements 273 all receive specularly reflected light and diffusely reflected light. Accordingly, the total amount of light received by the first light receiving elements will be greater than the total amount of light received by the second light receiving elements. Therefore, the output of the sensor 27 will be a higher voltage than the analog reference voltage as indicated by "State 1" in FIG. 10.

State 2 is a state in which the toner portion at the head of the patch image 81 reaches the reflection point of specularly reflected light to the #11 light receiving element 273. As shown in the diagram, in state 2, all of the second light receiving elements and all of the first light receiving elements apart from #11 receive specularly reflected light, but the #11 first light receiving element no longer receives specularly reflected light. Note that no longer receiving specularly reflected light denotes a state in which hardly any light is received. Also, diffusely reflected light is substantially uniformly incident on all of the light receiving elements 273. Accordingly, the total amount of light received by the second light receiving elements will be greater than the total amount of light received by the first light receiving elements. Therefore, the output of the sensor 27 will be a lower voltage than the analog reference voltage as indicated by "State 2" in FIG. 10.

State 3 is a state in which the toner-less portions of the patch image 81 are at the reflection points of specularly reflected light to all of the first light receiving elements. In other words, the toner portions of the patch image 81 are at the reflection points of specularly reflected light to all of the second light receiving elements. In this case, all of the second light receiving elements will receive only diffusely reflected light, and not specularly reflected light. In contrast, all of the first light receiving elements will receive specularly reflected light as shown by the dotted-line arrows in the diagram, in addition to diffusely reflected light. Therefore, the total amount of light received by the first light receiving elements will be greater than the total amount of light received by the second light receiving elements, with the difference being maximized. Therefore, the output of the sensor 27 will be the maximum voltage indicated by "State 3" in FIG. 10.

State 4 is a state in which the toner-less portions of the patch image 81 are at the reflection points of specularly reflected light to all of the second light receiving elements. In other words, the toner portions of the patch image 81 are at the reflection points of specularly reflected light to all of the first light receiving elements. In this case, all of the first light receiving elements will receive only diffusely reflected light, and not specularly reflected light. In contrast, all of the second light receiving elements will receive specularly reflected light as shown by the dotted-line arrows in the diagram, in addition to diffusely reflected light. Therefore, the total amount of light received by the second light receiving elements will be greater than the total amount of light received by the first light receiving elements, with the difference being maximized. Therefore, the output of the sensor 27 will be the minimum voltage indicated by "State 4" in FIG. 10.

Hereafter, the magnitude relationship of the total amounts of light received by the first and second light receiving elements is reversed as the patch image 81 moves, and the difference decreases. Therefore, the output of the sensor 27 oscillates between positive and negative around the analog reference voltage while the absolute value thereof decreases, as shown in FIG. 10. Note that the maximum amplitude of this sensor 27 depends on the amount of specularly reflected light. In other words, the maximum amplitude will change according to the ratio of toner in the toner portions of the patch image 81 (toner distribution ratio).

Figure 11A:
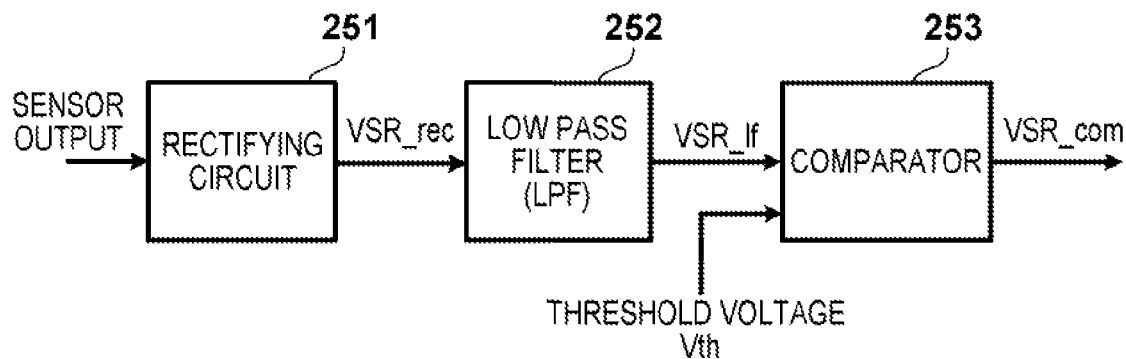
FIG. 11A is a block diagram of a control unit in an embodiment.
Figure 11B:
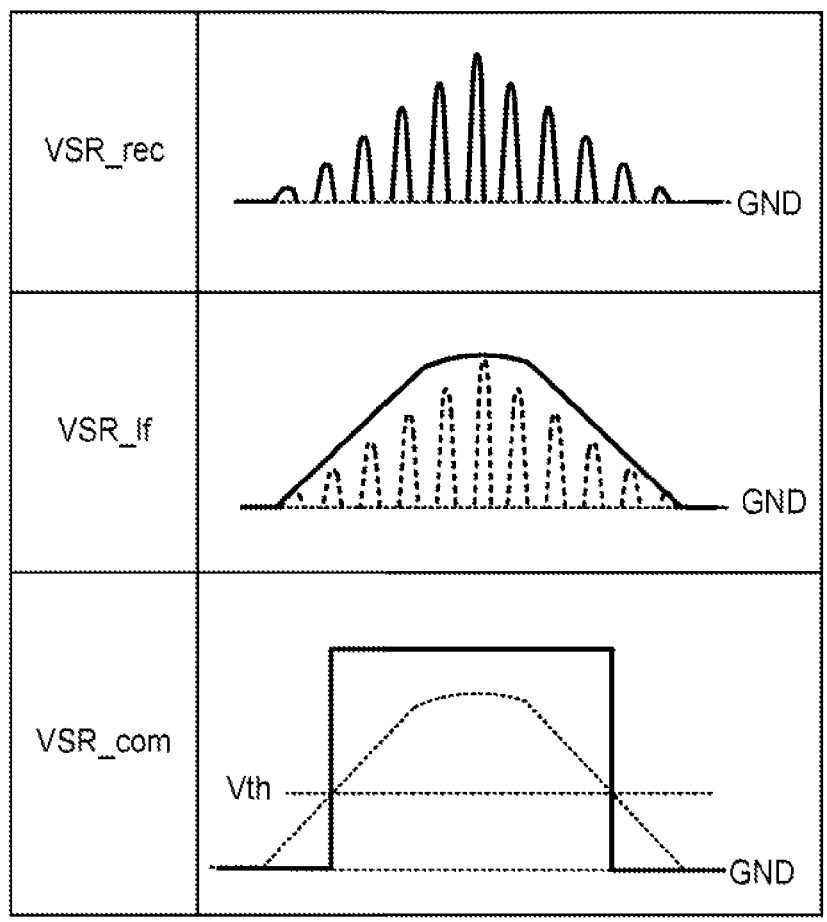
FIG. 11B is a diagram showing a waveform of each component shown in FIG. 11A.

The signal output by the sensor 27 is input to the control unit 25 of FIG. 1. At the time of color shift detection, the output signal from the sensor 27 is, as shown in FIG. 11A, rectified with a rectifying circuit 251 of the control unit 25 and waveform-shaped with a low pass filter 252. The waveform-shaped signal is binarized based on a threshold voltage $V_{th}$ by a comparator 253 and formed into a rectangle wave. An output signal VSR_rec of the rectifying circuit 251, an output signal VSR_lf of the low pass filter 252, and an output signal VSR_com of the comparator 253 are shown in FIG. 11B. The CPU 26 detects the position of each patch image from the output signal VSR_com of the comparator 253, and detects position shift of the patch images with a method which will be discussed later. Note that although the detection time (detection position) of the patch images is given as the time at which the center of VSR_com is detected in the following description, the detection time may be at another position of VSR_com.

Color Shift Detection Sequence (First Correction Control)

Figure 12:
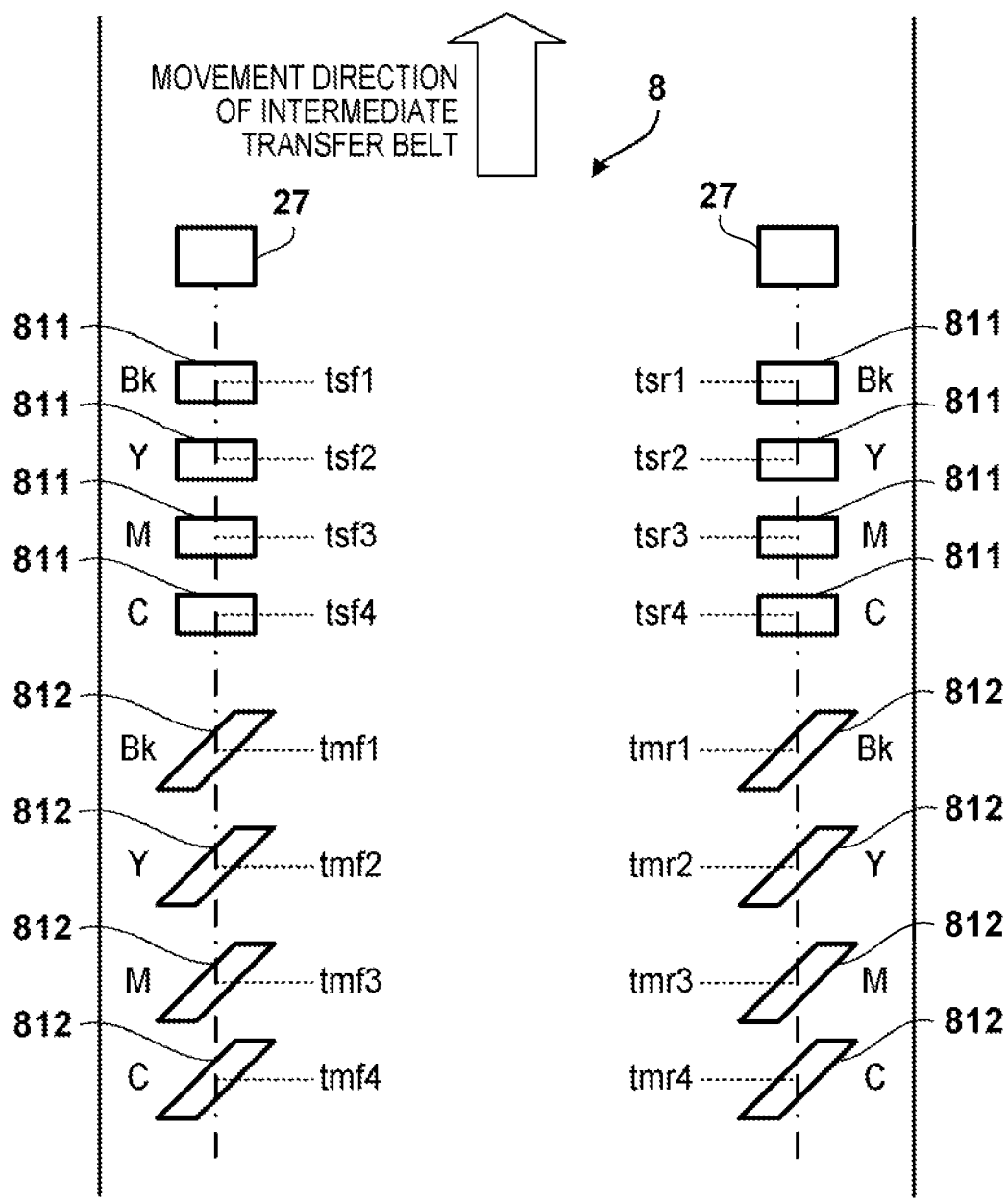
FIG. 12 is a diagram showing patch images formed on an intermediate transfer belt in an embodiment.

Next, detection of the amount of color shift, or in other words, position shift, will be described using FIGS. 12 to 16. In the case of detecting color shift, the control unit 25 controls the selection unit 270 so as to set the connection state of FIG. 4A. Then, as shown in FIG. 12, an image forming unit forms two types of patch images 811 and 812 for color shift detection, for each color, on both sides of the intermediate transfer belt 8, for example. Here, the patch images 811 are for detecting the amount of position shift in the sub-scanning direction, and the patch images 812 are for detecting the amount of position shift in the main scanning direction. Note that, in FIG. 12, the sub-scanning direction is the same direction as the movement direction of the intermediate transfer belt 8 shown by the arrow, and the main scanning direction is the direction orthogonal to the sub-scanning direction in the plane of the intermediate transfer belt 8. Also, in FIG. 12, Bk, Y, M, and C indicate that the colors of the patch images adjacent thereto are respectively black, yellow, magenta and cyan. The patch images on each side of the intermediate transfer belt 8 are respectively measured with a sensor 27 corresponding to each side. Note that, in FIG. 12, detection times tsf1-4, tmf1-4, tsr1-4 and tmr1-4 indicate the detection times of the patch images.

Figure 13B:
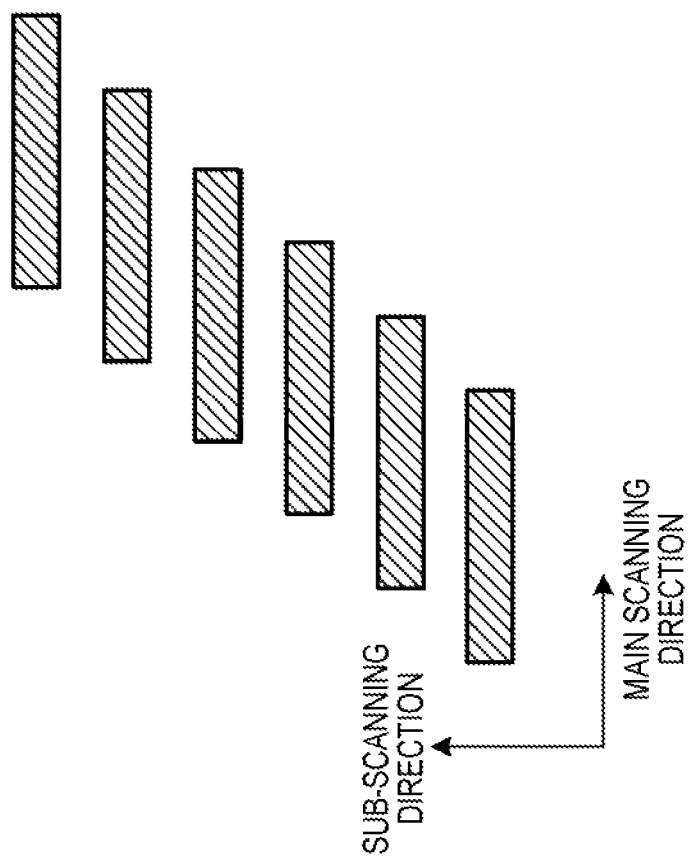
FIGS. 13A and 13B are diagrams showing patch images in an embodiment.
Figure 13A:
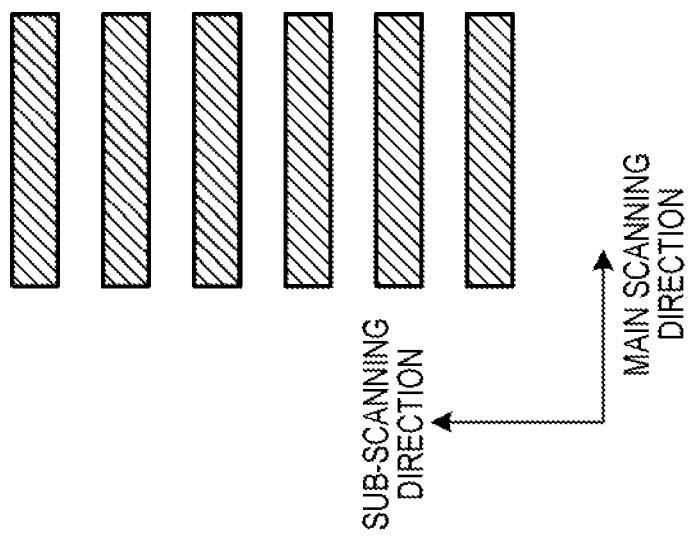

Here, the patch image 811 is a banded toner image in which six toner lines are disposed at an equal pitch in the sub-scanning direction so as to be positionally aligned in the main scanning direction, as shown in FIG. 13A. The patch image 812 is a banded toner image that slopes at 45 degrees as a whole in which six toner lines are disposed at an equal pitch in the sub-scanning direction so as to be displaced by the same distance in the main scanning direction, as shown in FIG. 13B. Note that the pitches and widths of the toner portions and the toner-less portions are as shown in FIG. 6, and in the present embodiment the width of the toner portions is 1 dot.

Figure 14:
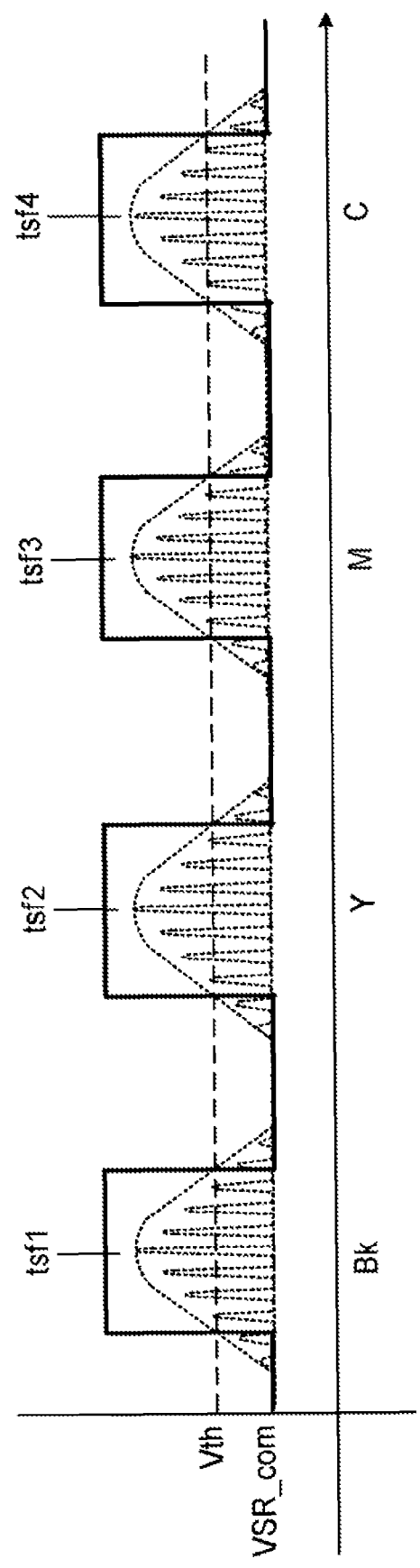
FIG. 14 is a diagram showing waveforms of each component in the case where the patch images of FIGS. 13A and 13B are detected.

FIG. 14 shows the output signals of the comparator 253 when the sensor 27 on the left side in FIG. 12 is receiving reflected light from the area in which the patch images 811 are formed. Note that, for reference purposes, the output of the rectifying circuit 251 and the low pass filter 252 and the threshold of the comparator 253 are shown with dotted lines. As mentioned above, in the present embodiment, an intermediate position between the rising edge and the falling edge of the output signal of the comparator 253 is taken as the detection time of the patch images.

First, theoretical distances of the Y, M and C patch images 811 from the Bk patch image 811 on each side are given as dsY(m), dsM(m) and dsC(m). In this case, the amounts of position shift δesY, δesM and δesC of Y, M and C in the sub-scanning direction relative to the reference color Bk are as follows:

$$\delta esY = v^*\{(tsf2-tsf1)+(tsr2-tsr1)\}/2 - dsY \quad (1)$$

$$\delta esM = v^*\{(tsf3-tsf1)+(tsr3-tsr1)\}/2 - dsM \quad (2)$$

$$\delta esC = v^*\{(tsf4-tsf1)+(tsr4-tsr1)\}/2 - dsC \quad (3)$$

where v(m/s) is the movement velocity of the intermediate transfer belt 8.

Also, the actual distances of the patch images 811 and the patch images 812 of the same colors on the left side are respectively as follows:

$$dmfBk = v^*(tmf1-tsf1) \quad (4)$$

$$dmfY = v^*(tmf2-tsf2) \quad (5)$$

$$dmfM = v^*(tmf3-tsf3) \quad (6)$$

$$dmfC = v^*(tmf4-tsf4) \quad (7)$$

Note that dmfBk, dmfY, dmfM and dmfC are the actual distances of the Bk, Y, M and C patch images, respectively.

Similarly, the actual distances of the patch images 811 and the patch images 812 for the same colors on the right side are respectively as follows.

$$dmrBk = v^*(tmr1-tsr1) \quad (8)$$

$$dmrY = v^*(tmr2-tsr2) \quad (9)$$

$$dmrM = v^*(tmr3-tsr3) \quad (10)$$

$$dmrC = v^*(tmr4-tsr4) \quad (11)$$

Note that dmrBk, dmrY, dmrM and dmrC are the actual distances of the Bk, Y, M and C patch images, respectively.

Here, the amounts of position shift δemfY, δemfM and δemfC of the Y, M and C patch images in the main scanning direction based on Bk are as follows for the patch images on the left side.

$$\delta emfY = dmfY - dmfBk \quad (12)$$

$$\delta emfM = dmfM - dmfBk \quad (13)$$

$$\delta emfC = dmfC - dmfBk \quad (14)$$

Similarly, the amounts of position shift δemrY, δemrM and δemrC of the Y, M and C patch images in the main scanning direction based on Bk are as follows for the patch images on the right side.

$$\delta emrY = dmrY - dmrBk \quad (15)$$

$$\delta emrM = dmrM - dmrBk \quad (16)$$

$$\delta emrC = dmrC - dmrBk \quad (17)$$

Note that the direction of shift can be judged from the positive or negative sign of the value. The write position for each color is corrected, based on the amount of position shift on the left side in the main scanning direction. Also, the width in the main scanning direction is corrected, based on the difference in the amounts of position shift of the same colors on both sides in the main scanning direction. Note that in the case where there is an error in the width in the main scanning direction, the write positions are corrected with consideration for the amount of change in the image frequency that changes following correction of the width in the main scanning direction.

Figure 15A:
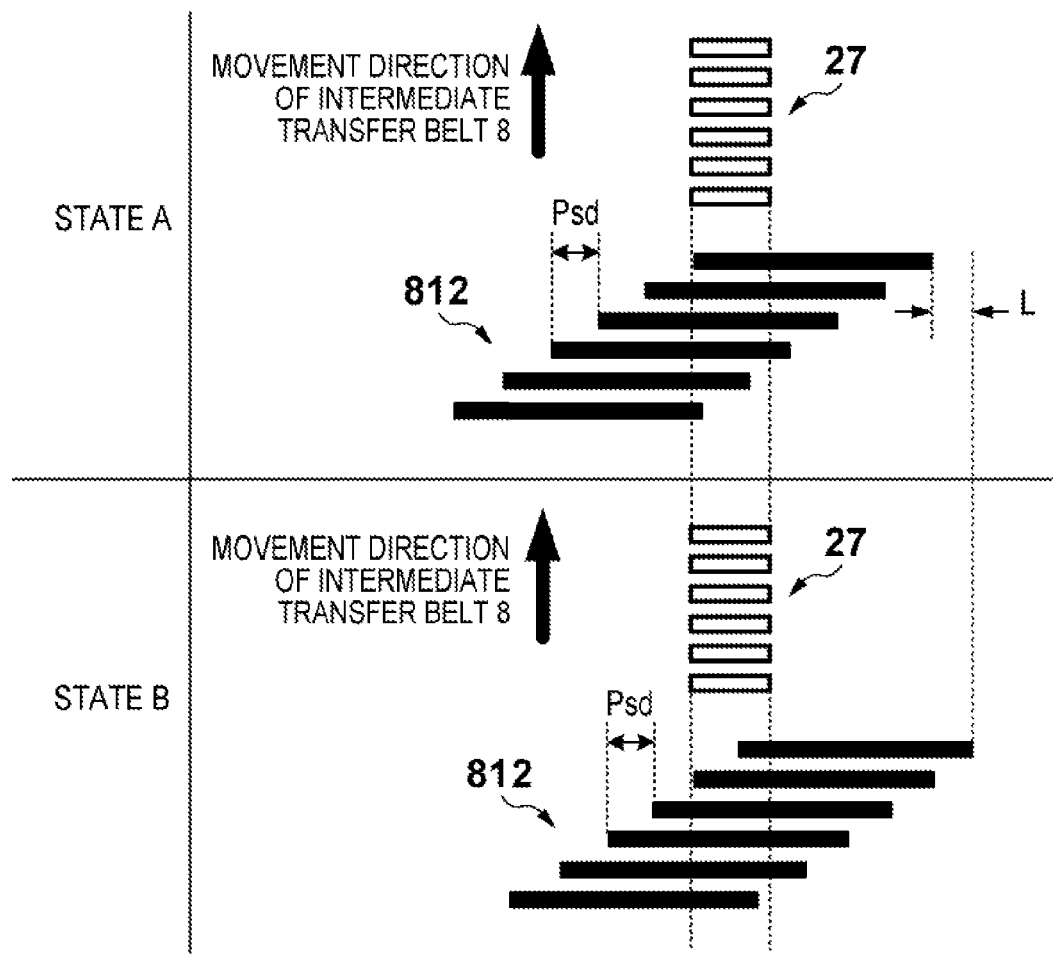
FIGS. 15A and 15B are diagrams illustrating detection of the amount of color shift in a main scanning direction in an embodiment.
Figure 15B:
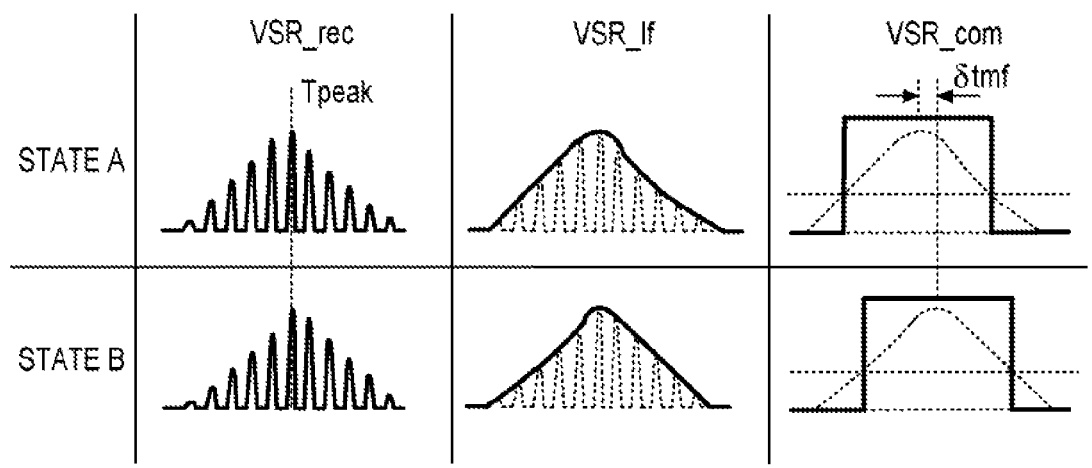

Next, the principles for detecting position shift in the main scanning direction will be described using FIG. 15A and FIG. 15B. States A and B in FIG. 15A respectively show different positional relationships between the light receiving elements of the sensor 27 and the patch images 812. Note that the patch images in states A and B are both patterns in which the positions of adjacent toner portions are displaced by Psd in the main scanning direction. Also, the patch image 812 in state B is, as a whole, displaced more to the right side of the diagram in the main scanning direction than in state A by a distance L. With regard to the first toner portion of the patch image 812 in state B, the area of the toner portion in the detection range of the sensor 27 is small when compared with the patch image in state A, as is clear from FIG. 15A. In contrast, with regard to the last toner portion of the patch image 812 in state A, the area of the toner portion in the detection range of the sensor 27 is small when compared with the patch image in state B. Accordingly, with regard to the output of the sensor 27 at the time of state A, the rising edge and the falling edge are earlier than at the time of state B. Therefore, as shown in FIG. 15B, a time Tpeak at which the rectified VSR_rec signal peaks is the same, but in state A the output of the portion of the VSR_rec signal left of center is greater than in state B, and the output of the portion right of center is smaller than in state B.

The waveform of the VSR_lf signal waveform-shaped by the low pass filter thus produces distortion, with the position of the centroid shifting to the left in state A and the position of the centroid shifting to the right in state B. Accordingly, a shift occurs at the time at which the VSR_lf signal intersects the threshold voltage $V_{th}$ in states A and B, and the rise time and fall time of the VSR_com signal shift. The time of the intermediate position between the rising edge and the falling edge of the VSR_com signal, which is the detection timing of the patch images, also shifts by δtmf as shown in FIG. 15B. Accordingly, the amount of position shift in the main scanning direction can be calculated as v*δtmf from the velocity v of the intermediate transfer belt 8. As described above, a slight position shift in the main scanning direction that is smaller than the displacement amount Psd of the patch image 812 in the main scanning direction is detectable.

The control unit 25 determines the amount of position shift in each direction as mentioned above. The control unit 25 then performs correction by correcting the write timing, with regard to the write position in the main scanning direction. Also, the control unit 25 corrects the magnification in the main scanning direction by performing frequency correction of the clock signal used for scanning in the main scanning direction. Furthermore, the control unit 25 corrects the write position in the sub-scanning direction by correcting the write timing and the surface phase of a rotary polygon mirror used for scanning of the photosensitive members 18a to 18d in the exposure units 11a to 11d.

With the conventional technology, the width of the toner portions of the patch image for color shift detection needed to be about the same as the spot diameter of the sensor, or approximately 2 mm. In other words, with the conventional technology, the length of each patch image in the conveyance direction needed to be approximately 2 mm. However, in the present embodiment, the toner portions of the patch image 81 can be configured at a 1-dot width. Therefore, with the patch image 81 having six toner portions in the present embodiment, the length of the patch image 81 in the conveyance direction can be configured to be approximately one third (about 0.7 mm) of the conventional length. The overall length of the patch image 81 for color shift detection in the conveyance direction can thereby be shortened. Note that although the width of the toner portions of the patch image 81 for color shift detection in the present embodiment is small, the patch image can be detected with a sufficient signal level since the signals from a plurality of light receiving elements 273 are added together.

Furthermore, the amount of toner used in detection of color shift can also be reduced to approximately one tenth of the conventional amount of toner. As a result, removal of patch images from the intermediate transfer belt 8 is facilitated, and miniaturization of the box for collecting removed toner can be anticipated.

Density Detection Sequence (Second Correction Control)

Next, density detection will be described. In the case of detecting density, the control unit 25 controls the selection unit 270 so as to set the connection state in FIG. 4B. In FIG. 4B, three consecutive light receiving elements 273 are taken as one light receiving unit. Accordingly, with the configuration of FIG. 4B, the width at which the first light receiving elements and the second light receiving elements are switched is increased substantively three fold, as compared with the configuration of FIG. 4A. The pitch of the first light receiving units is also three times the pitch of the first light receiving elements shown in FIG. 4A (or the pitch of the second light receiving elements). Note that the three-fold increase described here is not exact, and denotes an increase of at least approximately three fold. This is because a slight deviation from an exact three-fold increase is envisioned within an allowable range of component accuracy or disposition accuracy of the light receiving elements.

Figure 16A:
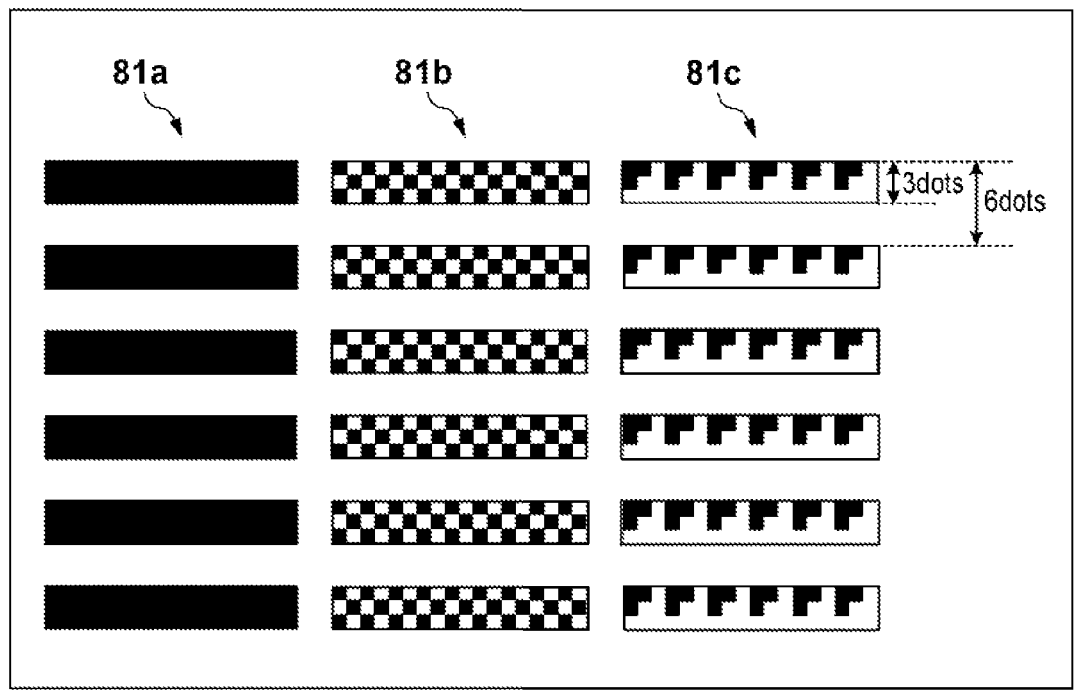
FIG. 16A is a diagram showing patch images in an embodiment.

FIG. 16A shows exemplary patch images 81 for density detection. Note that with the patch images 81a, 81b and 81c, the toner distribution ratio of the toner portions is 100%, 50% and 30%, respectively. The patch images 81a, 81b and 81c all have toner portions that are 3 dots in width and toner-less portions that are 3 dots in width. In other words, toner portions and toner-less portions are both three times the width of the patch images 811 and 812 for color shift detection. Accordingly, since the width and pitch of the light receiving elements and the width and pitch of the toner portions of the patch images 81 are in the relationship shown in FIG. 6, the sensor 27, having detected the patch images 81a, 81b and 81c, will output signals of a similar wavelength to FIG. 10. As already described, since the maximum amplitude of the output of the sensor 27 changes according to the ratio of toner in the toner portions (toner distribution ratio), the density can be detected from the maximum amplitude of the sensor 27. Note that in FIG. 4B, there will be a total of four light receiving units when groups of three consecutive light receiving elements 273 are regarded as one light receiving unit. Accordingly, when a patch image 81 that includes six toner portions as shown in FIG. 16A is detected, the maximum amplitude will continue for five oscillations, although operation is not affected.

Figure 16B:
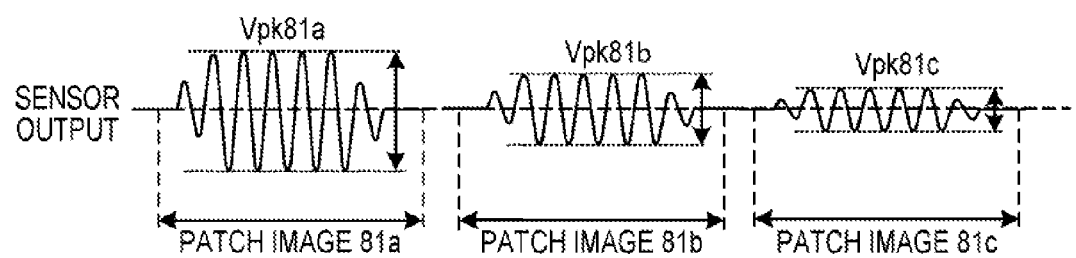
FIG. 16B is a diagram showing output waveforms of a sensor when the patch images in FIG. 16A are detected.

Vpk81a, Vpk81b and Vpk81c in FIG. 16B are respectively the maximum outputs of the sensor 27 when the patch images 81a, 81b and 81c are used. As shown in FIG. 16B, Vpk81b and Vpk81c are respectively 50% and 30% of Vpk81a, and values that depend on the toner distribution ratios of the toner portions of the patch images 81 are output from the sensor 27.

The signal output by the sensor 27 is input to the control unit 25 of FIG. 1. The control unit 25 also serves as a determination unit that determines the density of the patch images 81 from the peak value of the output signal of the sensor 27. As shown in FIG. 17A, in the control unit 25, the output signal from the sensor 27 is rectified with the rectifying circuit 251 and waveform-shaped with the low pass filter 252. The output of the low pass filter 252 is connected to an analog detection terminal of the CPU 26, and undergoes analog-to-digital conversion in the CPU 26 and is imported as density data. The output signal VSR_rec of the rectifying circuit 251 and the output signal VSR_lp of the low pass filter 252 are shown in FIG. 17B.

As described above, in the present embodiment, diffusely reflected light is incident on all of the light receiving elements 273, and is processed by a differential circuit in the sensor 27. Accordingly, the control unit 25 is able to perform uniform processing for all of the colors, without needing to perform correction processing or the like on diffusely reflected light. Furthermore, the patch image 81 for density detection is a repetitive pattern of six dots in total consisting of toner portions having a 3-dot width and toner-less portions having a 3-dot width, for example, so even if the pattern is repeated six times, a single patch image 81 having a total width of 36 dots can be formed. In the conventional technology, the size of the patch image 81 for density detection is dependent on the spot diameter of the light emitting element 272, and with a 600 dpi printer, for example, a patch image of around 150 to 200 dots in size is required. Accordingly, the amount of toner consumption can also be dramatically reduced in comparison with conventional technology. Therefore, cleaning of toner on the intermediate transfer belt 8 is facilitated, and miniaturization of the waste toner box for collecting waste toner after cleaning can be anticipated. Also, the amount of light emission of the light emitting element 272 can be suppressed, by disposing the light receiving elements 273 in an array. Also, the configuration is simplified since the spot diameter of the light emitting element 272 does not need to be narrowed down.

Note that although twelve light receiving elements 273 are used in each of the above-mentioned embodiments, the number of light receiving elements is arbitrary. Also, in FIG. 4A, six each of the first light receiving elements and the second light receiving elements are disposed alternately, and in FIG. 4B, two each of first light receiving units including three consecutive first light receiving elements and second light receiving units including three consecutive second light receiving elements are disposed alternately. However, it is also possible to use thirty-six light receiving elements 273, with only twelve being used at the time of color shift detection in a configuration such as shown in FIG. 4A, and six first light receiving units and six second light receiving units being deployed alternately at the time of density detection, by regarding three consecutive light receiving elements as one light receiving unit. Furthermore, the pitch of the toner portions and the pitch of the light receiving elements shown in FIG. 6 apply to the case where the light emitting element 272 and the light receiving elements 273 are disposed in the same plane parallel to the intermediate transfer belt 8, and the present embodiment is not limited to the pitches shown in FIG. 6. In other words, in a case such as where the substrate 271 has a level difference, for example, the pitch of the toner portions or the pitch of the light receiving elements can be changed, according to the difference in the installation surfaces of the light emitting element 272 and the light receiving elements 273.

Figure 18:
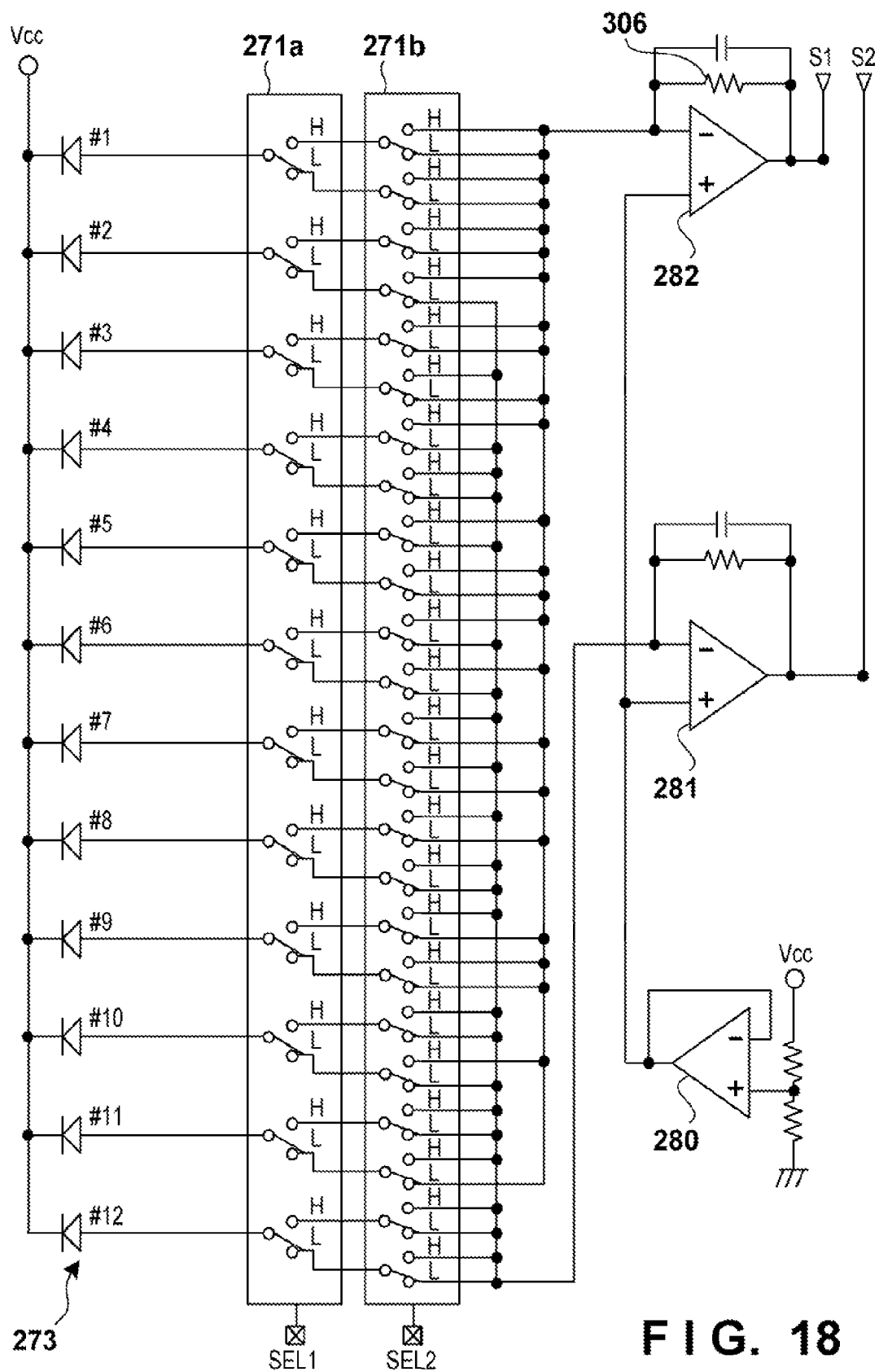
FIG. 18 is a circuit diagram of a sensor in an embodiment.

Also, in the above-mentioned embodiments, the selection circuit 270 is able to set the output destination independently for each light receiving element 273. However, as shown in FIG. 18, a configuration can also be adopted in which selection circuits 271a and 271b that include switches for collectively selecting the same output destination are combined. In FIG. 18, the selection circuit 271a switches all of the switches to the high (H) or low (L) side, according to whether the input of a terminal SEL1 is high (H) or low (L). Similarly, the selection circuit 271b switches all of the switches to the high (H) or low (L) side, according to whether the input of a terminal SEL2 is high (H) or low (L). Note that in FIG. 18, the differential amplifier 283 and the like are omitted for simplification. Inputs to the terminals SEL1 and SEL2 and corresponding states are shown in FIGS. 19A to 19D. Note that in FIGS. 19A to 19D, the shaded portions indicate the light receiving elements 273 connected to the IV conversion amplifier 282 and the remaining portions indicate the light receiving elements 273 connected to the IV conversion amplifier 281, similarly to FIGS. 4A and 4B. In this embodiment, the state can be switched with a 2-bit signal.

Second Embodiment

Figure 20:
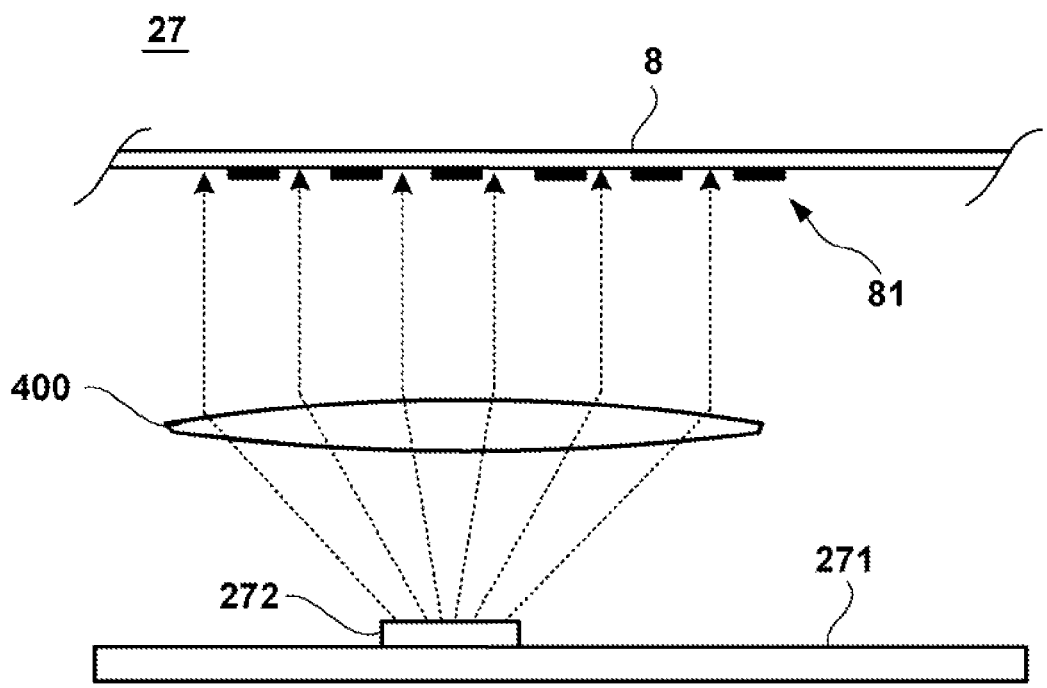
FIG. 20 is a diagram illustrating reception of specularly reflected light from a patch image in an embodiment.

Next, a second embodiment will be described focusing on differences with the first embodiment. Note that the same reference numerals are used for similar constituent elements to the first embodiment, and description thereof is omitted. In the present embodiment, as shown in FIG. 20, a lens 400 is provided in the sensor 27, and light from the light emitting element 272 is irradiated onto the intermediate transfer belt 8 after being converted into parallel light.

Figure 21:
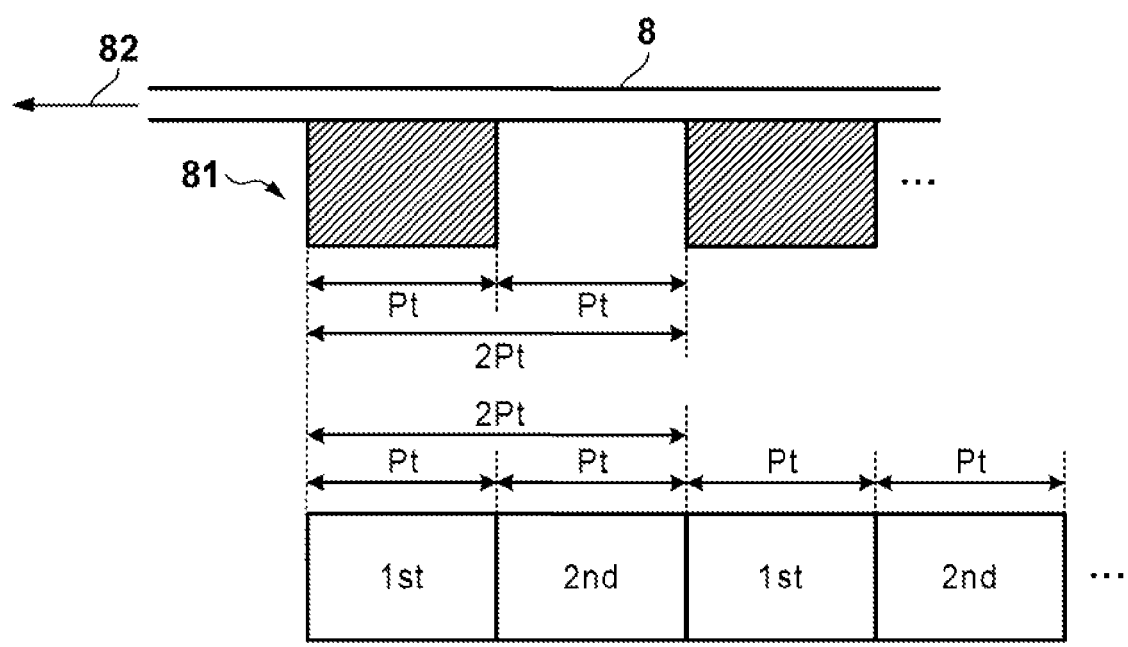
FIG. 21 is a diagram showing the relationship between the pitch of light receiving elements of a sensor and the pitch of lines of a patch image in an embodiment.
Figure 22:
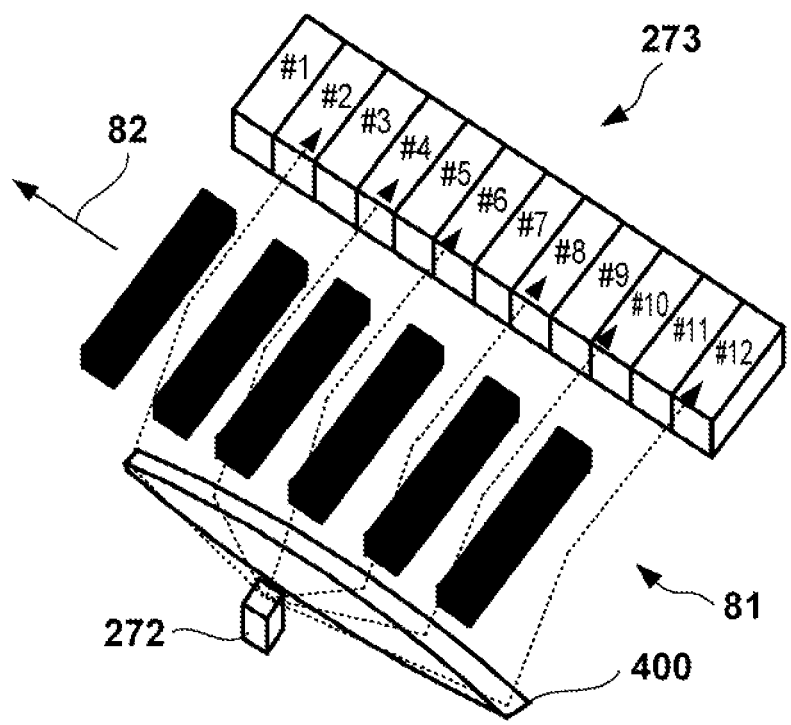
FIG. 22 is a perspective view illustrating reception of specularly reflected light from a patch image in an embodiment.

In the present embodiment, the pitch of the toner portions of the patch image 81 is 2Pt, as shown in FIG. 21. In other words, the pitch of the toner portions of the patch image 81 is equal to the pitch of the first light receiving elements and the pitch of the second light receiving elements. As shown in FIG. 22, light from the light emitting element 272 is corrected and converted into parallel light by the lens 400. Parallel light that is incident on the toner-less portions of the patch image 81 is specularly reflected, and, as shown in FIG. 22, is incident on only the odd-numbered or the even-numbered light receiving elements 273 according to the position of the patch image 81. In other words, this light is incident on the first light receiving elements or the second light receiving elements when the light receiving elements are selected as shown in FIG. 4A. In contrast, light that is incident on the toner portions of the patch image 81 is diffusely reflected, and is incident on each light receiving element 273, similarly to the first embodiment. The dotted-line arrows in FIG. 22 show light that is incident on the even-numbered light receiving elements 273 after having been specularly reflected by the toner-less portions of the patch image 81.

In the present embodiment, the output of the sensor 27 when the patch image 81 moves together with the intermediate transfer belt 8 is similar to the first embodiment. In the present embodiment, irradiated light is converted to parallel light by the lens 400. Thus, there is the advantage that even in the case where the sensor 27 and the intermediate transfer belt 8 are separated at a distance, there is no accompanying drop in the amount of light due to diffusion of light. Therefore, restrictions on the disposition position of the sensor 27 are reduced, and flexibility in device design increases.

As mentioned above, a plurality of light receiving elements 273 are disposed, and the selection circuit 270 selects first light receiving elements and second light receiving elements from this plurality of light receiving elements 273. This selection is performed by alternately selecting a group of one or more consecutively disposed light receiving elements 273 as the first light receiving elements and the second light receiving elements. Note that consecutively disposed first light receiving elements are taken as first light receiving units, and consecutively disposed second light receiving elements are taken as second light receiving units. Here, the number of consecutive light receiving elements included in the first light receiving units and the second light receiving units is decided based on the pitch or width of the toner portions of the patch images according to each correction control that are formed on the intermediate transfer belt 8. Specifically, let the pitch of the toner portions of the patch image (first patch image) formed in color shift or position shift control (first correction control) be a first pitch, and the pitch of the toner portions of the patch image (second patch image) formed in density control (second correction control) be a second pitch. Also, let the numbers (one or more) of consecutive light receiving elements 273 included in each light receiving unit at the time of the first correction control and the second correction control respectively be a first number and a second number. When the first number is n (integer of one or more), the second number can be defined as m (integer of one or more that is not equal to n). In this case, the ratio of the second pitch to the first pitch will be equal to the ratio (m/n) of the second number to the first number. In other words, in the case where the second pitch is N times the first pitch (N being a natural number), the second number will be N times the first number. According to this configuration, the patch images required when detecting density and color shift are formed at an arbitrary size, and the control unit 25 can variably set the number (one or more) of consecutive light receiving elements 273 that are set as first light receiving elements or second light receiving elements in accordance with the size of the patch images.

Note that the first pitch and the second pitch can also be read as the width of the toner portions. In other words, let the line width of the toner portions of the patch image formed in color shift or position shift control be a first line width, and the line width of the toner portions of the patch image formed in density control be a second line width. Also, let the numbers (one or more) of consecutive light receiving elements 273 included in each light receiving unit at the time of first correction control and second correction control respectively be n and m, similarly to the above. In this case, the ratio of the second line width to the first line width will be equal to the ratio (m/n) of the second number to the first number.

Moreover, it is assumed that light irradiated by the light emitting element 272 that is specularly reflected at positions on the intermediate transfer belt 8 that are separated by a pitch (pitch A) in the movement direction of the lines of the patch image that is formed will be separated by a pitch B at the place where the light receiving elements 273 is disposed. In this case, the pitch of the first light receiving elements (or first light receiving units) and the pitch of the second light receiving elements (or second light receiving units) will be a length obtained by multiplying the pitch of the toner portions by (length of pitch B/length of pitch A). In other words, the ratio of the line width of the toner portions (patch image) in the above movement direction and the width of the light receiving elements (or light receiving units) in the above movement direction will be equal to the ratio of pitch A (first pitch) and pitch B (second pitch).

More specifically, in a case such as where the light emitting element 272 and the light receiving elements 273 are disposed on the same substrate, the respective pitches of the first light receiving units and the second light receiving units are set to twice the pitch of the toner portions of the patch image 81. Also, in the case where light from the light emitting element 272 is converted into parallel light using a lens or the like, the pitches of the first light receiving units and the second light receiving units are set to be equal to the pitch of the toner portions of the patch image 81. This configuration has the advantage that in the case where the sensor 27 and the intermediate transfer belt 8 are separated at a distance, there is no accompanying drop in the amount of light due to diffusion of light, and therefore, restrictions on the disposition position of the sensor 27 are reduced.

As described above, a patch image for density detection and a patch image for color shift detection are formed as necessary, and the control unit 25 detects density or color shift using each patch image. As mentioned above, density and color shift can be detected using the output of one sensor, and the size of each patch image can be reduced.

Third Embodiment

In the first embodiment and the second embodiment, description was given using color shift or position shift control and density control as types of correction control (first correction control, second correction control). However, the types of correction control are not limited thereto, and are described hereinafter using FIGS. 19A to 19E. FIG. 19A shows a setting state of light receiving units that is the same as FIG. 4A, and FIG. 19C shows a setting state of light receiving units that is the same as FIG. 4B.

For example, it is also effective in density control to switch between prioritizing detection accuracy and prioritizing shortness of the overall patch image. In FIG. 19D, a configuration is adopted in which setting of the light receiving units at a greater pitch than FIG. 19C can be performed by the control unit 25 in the case of high accuracy density control, by regarding the #1 to #6 light receiving elements and the #7 to #12 light receiving elements each as one light receiving unit. Since the detection area per patch image increases, detection accuracy improves. Note that in order to regard a plurality of light receiving elements as one light receiving unit, it is not necessary to allocate all the light receiving elements to a light receiving unit, and as shown in FIG. 19E, it is also possible to regard the #3 to #6 light receiving elements and the #7 to #10 light receiving elements each as one light receiving unit, without using the #1,#2, #11 and #12 light receiving elements. In other words, since it is possible to form the patch image for density control that is detected by the light receiving units of FIG. 19E by making the line width thereof shorter than the line width of the patch image for density control that is detected by the light receiving units of FIG. 19D, the overall length of the patch image for density control can be shortened.

Also, changing the pitch according to the detection application is also effective in color shift correction control. For example, in FIG. 19B, the light receiving units are set at a greater pitch than in FIG. 19A, by regarding every two light receiving elements as one light receiving unit. Despite the decrease in detection resolution when the pitch is enlarged in the case of color shift correction control, it is, conversely, advantageous in reducing the noise component caused by unevenness on the surface of the intermediate transfer belt 8. In other words, although the settings in FIG. 19C and FIG. 19D were described as being for density detection, such settings can also be used for color shift correction. In other words, if there is a large number of light receiving elements, the noise component caused by unevenness on the surface of the intermediate transfer belt can be reduced, by increasing the thickness of the line width of the patch image for color shift correction, according to the setting of the light receiving units in each of FIGS. 19A to 19E.

In this way, changing the pitch of the patch images or light receiving units that are generated, according to the priority of the detection application, enables the detection applications to be expanded and various states of toner formed on the intermediate transfer belt to be detected, with the same sensor (hardware).

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-233263, filed on Oct. 24, 2011, and 2012-185767, filed on Aug. 24, 2012, which are hereby incorporated by reference herein in their entirety.

The invention claimed is:

1. An image forming apparatus comprising:
an image carrier;
an image forming unit configured to form a patch image on the image carrier;
a light emitting unit;
a light receiving unit configured to receive light reflected by the patch image when the patch image that moves with movement of the image carrier is irradiated with light by the light emitting unit, and including one or more light receiving elements; and
a setting unit configured to set the number of light receiving elements included in the light receiving unit,
wherein the setting unit sets a first subset of light receiving elements for receiving reflected light from a first patch image formed by the image forming unit and sets a second subset of light receiving elements for receiving reflected light from a second patch image formed by the image forming unit, with the number of light receiving elements in the first subset differing from that in the second subset.

2. The image forming apparatus according to claim 1, wherein the first patch image and the second patch image are formed at different line widths.

3. The image forming apparatus according to claim 2, wherein the setting unit is further configured to set the number of light receiving elements included in the light receiving unit at a time of detecting the first patch image to n, where n is an integer of 1 or more, and set the number of light receiving elements included in the light receiving unit at a time of detecting the second patch image to m, where m is an integer of one or more that differs from n,
the image forming unit is further configured to form the first patch image at a first line width, and form the second patch image at a second line width, and
a ratio of the first line width and the second line width is a ratio of n and m.

4. The image forming apparatus according to claim 1, comprising a plurality of light receiving units,
wherein in a case where light irradiated by the light emitting unit that is specularly reflected at two positions on the image carrier, separated by a first pitch in a movement direction of the image carrier, forms a second pitch in the movement direction at a place where the plurality of light receiving units are disposed, a ratio of a line width of the patch image in the movement direction and a width of the light receiving units in the movement direction is a ratio of the first pitch and the second pitch.

5. The image forming apparatus according to claim 1, comprising a plurality of light receiving elements arranged in an array, and further comprising an output unit configured to output an output signal that depends on a difference between an amount of light received by first light receiving element disposed in odd-numbered positions in the array and an amount of light received by second light receiving elements disposed in even-numbered positions in the array.

6. The image forming apparatus according to claim 1, wherein the first patch image is a patch for density correction, and the second patch image is a patch for color shift correction.

7. The image forming apparatus according to claim 1, wherein the first patch image is a patch for density correction, and the second patch image is a patch for density correction that differs from the first patch image.

8. The image forming apparatus according to claim 1, wherein the first patch image is a patch for color shift correction, and the second patch image is a patch image for color shift correction that differs from the first patch image.

* * * * *